US009217060B2

(12) United States Patent
Ando

(10) Patent No.: US 9,217,060 B2
(45) Date of Patent: Dec. 22, 2015

(54) CURABLE COMPOSITION

(75) Inventor: Katsuhiro Ando, Pasadena, TX (US)

(73) Assignees: KANEKA CORPORATION, Osaka (JP); KANEKA NORTH AMERICA, LLC, Pasadena, TX (US)

( * ) Notice: Subject to any disclaimer, the term of this patent is extended or adjusted under 35 U.S.C. 154(b) by 171 days.

(21) Appl. No.: 13/497,113

(22) PCT Filed: Oct. 18, 2010

(86) PCT No.: PCT/JP2010/068776
§ 371 (c)(1),
(2), (4) Date: May 2, 2012

(87) PCT Pub. No.: WO2011/046235
PCT Pub. Date: Apr. 21, 2011

(65) Prior Publication Data
US 2012/0207998 A1    Aug. 16, 2012

Related U.S. Application Data

(60) Provisional application No. 61/252,470, filed on Oct. 16, 2009.

(51) Int. Cl.
B05D 7/26      (2006.01)
C08G 65/336    (2006.01)
C08L 71/02     (2006.01)
E04B 1/64      (2006.01)

(52) U.S. Cl.
CPC .............. *C08G 65/336* (2013.01); *B05D 7/26* (2013.01); *C08L 71/02* (2013.01); *E04B 1/644* (2013.01); *B05D 2518/10* (2013.01)

(58) Field of Classification Search
None
See application file for complete search history.

(56) References Cited

U.S. PATENT DOCUMENTS

| | | | |
|---|---|---|---|
| 3,169,899 A | 2/1965 | Steuber | |
| 3,532,589 A | 10/1970 | David | |
| 4,507,469 A | 3/1985 | Mita et al. | |
| 4,902,575 A | 2/1990 | Yukimoto et al. | |
| 5,051,463 A | 9/1991 | Yukimoto et al. | |
| 2002/0115770 A1* | 8/2002 | Georgeau et al. | 524/377 |
| 2007/0042196 A1 | 2/2007 | Smith | |
| 2008/0262143 A1* | 10/2008 | Sato et al. | 524/547 |
| 2010/0216925 A1 | 8/2010 | Yano | |

FOREIGN PATENT DOCUMENTS

| | | |
|---|---|---|
| JP | 43-021112 | 9/1966 |
| JP | 42-019520 | 10/1967 |
| JP | 55-009669 A | 1/1980 |
| JP | 60-008024 A | 1/1985 |
| JP | 60-008024 B2 | 2/1985 |
| JP | 5-339490 A * | 12/1993 |
| JP | 05-339490 A | 12/1993 |
| JP | 2550123 B2 | 11/1996 |
| JP | 2835400 B2 | 12/1998 |
| JP | 11-43599 A * | 2/1999 |
| JP | 11-043599 A | 2/1999 |
| JP | 11-269369 A | 10/1999 |
| JP | 2009-120720 A * | 6/2009 |
| WO | 2009/011329 A1 | 1/2009 |

OTHER PUBLICATIONS

International Preliminary Report on Patentability (form PCT/IB/373) of International Application No. PCT/JP2010/068776 date of issuance Apr. 17, 2012 with Form PCT/ISA/237, (7 pages).
International Search Report of PCT/JP2010/068776, dated Feb. 22, 2011.

\* cited by examiner

*Primary Examiner* — Robert Sellers
(74) *Attorney, Agent, or Firm* — Westerman, Hattori, Daniels & Adrian, LLP

(57) ABSTRACT

The present invention has its object to provide a liquid-applied moisture-permeable waterproofing material that can protect a building from rainwater or humidity in the air, can drain moisture, which has been gathered on a substrate of a building, and can be applied easily. The present invention is a curable composition comprising:

(A) a polyoxyalkylene polymer having a silicon-containing group crosslinkable by forming a siloxane bond;
(B) a polyoxyalkylene plasticizer whose main chain contains 5 wt % or more of an oxypropylene-derived repeating unit and has one or more groups, at an end thereof, selected from the group consisting of an —OH group, a group represented by the formula:
—OR$^9$ (wherein R$^9$ is a substituted or unsubstituted C$_{1-20}$ hydrocarbon group),
and a group represented by the formula:
—NR$^{10}{}_2$ (wherein R$^{10}$ is each independently a hydrogen atom, or a substituted or unsubstituted C$_{1-20}$ hydrocarbon group).

14 Claims, No Drawings

CURABLE COMPOSITION

TECHNICAL FIELD

The present invention relates to a curable composition that contains a polyoxyalkylene polymer having a hydroxy or hydrolyzable group bonded to a silicon atom, and having a silicon-containing group crosslinkable by forming a siloxane bond (hereinafter, also referred to as a "reactive silicon group"). The present invention further relates to a liquid-applied moisture-permeable waterproofing material, which includes a curable composition that contains a polyoxyalkylene polymer having the reactive silicon group.

BACKGROUND OF THE INVENTION

Traditionally, methods of applying a waterproofing sheet on a substrate of exterior walls, or around openings such as windows, doors, or the like have been adopted, to protect a building from rainwater, or humidity in the air.

Common waterproofing sheets have both waterproofing property and moisture vapor proofness. Thus, it is impossible to drain moisture, which has been gathered on a substrate, through the sheet. This can be an issue of concern because the gathered moisture can cause corrosion of wood materials or steel frames, which may promote aging of buildings. The gathered moisture can also promote growth of mold or mildew, which may cause indoor air quality issues. As a result, residents may impair their health.

In order to overcome the issue, waterproofing sheets having both waterproofing property and moisture permeability have been developed. One typical example of such moisture-permeable waterproofing sheets is flash-spun nonwoven fabrics. Patent Document 1, for example, discloses a flash-spun nonwoven fabric. Patent Document 2 discloses a method for producing a flash-spun nonwoven fabric. The nonwoven fabric thus obtained has an appropriate pore size. It blocks water, but allows air and water vapor to pass therethrough. A known example of the nonwoven fabric is Tyvek (trademark; produced by DuPont) obtained by thermo-compressing a three-dimensionally-meshed fiber of high-density polyethylene. Such a moisture-permeable waterproofing sheet can prevent external water from infiltrating through the sheet, but can drain gathered moisture as water vapor; thereby, the above issue is to be solved.

However, the openings such as windows or doors is not flat, it is difficult to form a waterproofing layer only with a waterproofing sheet, and therefore the opening is often finished with a waterproofing tape with a pressure sensitive adhesive layer provided thereon. In this case, since the pressure sensitive adhesive layer is made of rubber or asphalt materials, the moisture permeability of the entire tape decreases, and the same problem as that of a common waterproofing sheet can occur.

On laminating the moisture-permeable waterproofing sheet on substrates of exterior walls, overlapped portions of two moisture-permeable waterproofing sheets are often fixed with nails, or pressure sensitive adhesive tapes. As a result, moisture may permeate from nail holes, or gaps of pressure sensitive adhesive tapes over a long period of time.

For overcoming the problem as to waterproofing around an opening or on a substrate of an exterior wall, a liquid-applied waterproofing material having moisture permeability has been developed (see Patent Document 3). In this case, a waterproofing material layer is continuously formed. As a result, the number of gaps formed by a waterproofing tape with a pressure sensitive adhesive layer provided thereon, or a nail remarkably decreases. This solves the problem of aging of a building, and health impairment, and also allows energy saving because of reduction in leakage of the internal air.

However, a composition used in the liquid-applied waterproofing material disclosed in Patent Document 3, etc. contains a latex polymer (aqueous emulsion). Such a composition requires a long period of time to form a continuous layer if it is coated in a condition at a low temperature, or a high humidity. Thus, it is difficult to apply the composition in winter. Moreover, since the coating of the latex polymer is poor in elasticity, it is not able to resist a prolonged strain of a substrate. Thus, cracks, breaks, etc. may occur in or on the coating, and waterproofing property may be deteriorated.

On the other hand, it has been known that an organic polymer that contains at least one reactive silicon group in a molecule can give a rubbery cured product. Such an organic polymer can crosslink even at a room temperature by forming siloxane bond through hydrolysis of the reactive silicon group under an existence of moisture in the air.

Patent Document 4, etc. discloses a reactive silicon group-containing organic polymer whose main chain is a polyoxyalkylene polymer among these reactive silicon group-containing organic polymers. Such a polymer has been already produced in a commercial scale, and widely used as sealing materials, adhesives, etc.

The polyoxyalkylene polymer having a reactive silicon group has a comparatively low viscosity. Thus, a nonaqueous liquid-applied waterproofing material, which is solvent-free, or contains a small amount of solvent and has sufficient workability can be designed. Further, a polyoxyalkylene polymer having a reactive silicon group can be practically cured even at a low temperature. Thus, it can be used in winter. Further, the polyoxyalkylene polymer having a reactive silicon group produces a rubbery cured product with favorable elasticity. Thus, such a rubbery cured product is expected to have sufficient resistance to strain from the substrate.

However, the liquid-applied waterproofing material, which is made of a known curable composition that contains this polymer, shows insufficient moisture permeability, although the material provides waterproofing property almost equivalent to that of the waterproofing sheet. Accordingly, the aforementioned problem has not been completely solved up to now. The present invention has its object to improve moisture permeability of the liquid-applied waterproofing material while maintaining waterproofing property.

By the way, a polyoxyalkylene plasticizer is effective to achieve the object of the present invention, and general polyoxyalkylene plasticizers have been used in some cases. There are some previous reports on curable compositions that contain polyoxyalkylene plasticizers. Patent Document 5 discloses a curable composition that contains a polyoxyalkylene plasticizer. The curable composition disclosed in Patent Document 5 shows a favorable viscosity, and causes no sedimentation-separation, or slump. Patent Document 6 discloses a technology of improving coatability of an alkyd paint composition on the surface of a cured product by a polyoxyalkylene plasticizer. Patent Document 7 discloses a technology of improving storage stability by a polyoxyalkylene plasticizer.

PATENT DOCUMENT

Patent Document 1: JP-B-42-19520 (U.S. Pat. No. 3,169,899)
Patent Document 2: JP-B-43-21112 (U.S. Pat. No. 3,532,589)
Patent Document 3: US 2007/0042196 A1
Patent Document 4: JP-A-55-9669 (U.S. Pat. No. 4,507,469)

Patent Document 5: JP-B-60-008024
Patent Document 6: JP-B-2550123 (U.S. Pat. No. 4,902,575)
Patent Document 7: JP-B-2835400 (U.S. Pat. No. 5,051,463)

SUMMARY OF THE INVENTION

Problems to be Solved by the Invention

The present invention has its object to provide a curable composition excellent in water vapor permeability, which can be applied at a low temperature, in which there is little migration of a plasticizer onto the surface of a cured product, and in which a viscosity change before and after storage is small; and a liquid-applied waterproofing material, which contains the curable composition.

Means for Solving the Problem

The present inventors have made intensive investigations to solve the problem, and consequently found that by using a polyoxyalkylene plasticizer (B) having a specific structure or a predetermined addition amount as a plasticizer of the polymer, the water vapor permeability of a cured product to be obtained is remarkably improved. Thus, the present inventors have completed the invention.

That is, the first aspect of the present invention relates to a curable composition comprising:

(A) a polyoxyalkylene polymer having a silicon-containing group crosslinkable by forming a siloxane bond;

(B) a polyoxyalkylene plasticizer whose main chain contains 5 wt % or more of an oxypropylene-derived repeating unit and has one or more groups, at an end thereof, selected from the group consisting of an —OH group, a group represented by the formula (7):

—$OR^9$ (wherein $R^9$ is a substituted or unsubstituted $C_{1-20}$ hydrocarbon group),
and a group represented by the formula (8):

—$NR^{10}_2$ (wherein $R^{10}$ is each independently a hydrogen atom, or a substituted or unsubstituted $C_{1-20}$ hydrocarbon group),
the curable composition being one of (1) a curable composition (I), wherein the component (B) is a polyoxyalkylene plasticizer (B1) that does not have an —$NH_2$ group at a molecular chain end, and contains polyoxyalkylene (b1) that has an —OH group at all molecular chain ends as an essential component, and has a molecular weight of 100 to 4500, and
wherein a ratio (W2/W1) of a total weight (W2) of the component (A) and the component (B1) with respect to a total weight of the curable composition (W1) is 51 to 80 wt %, (2) a curable composition (II), wherein the component (B) is a polyoxyalkylene plasticizer (B2) that does not have an —$NH_2$ group at a molecular chain end, and contains a polyoxyalkylene (b2) as an essential component, the polyoxyalkylene (b2) having both an —OH group and a group represented by the formula (7) at a molecular chain end:

—$OR^9$ (wherein $R^9$ is a substituted or unsubstituted $C_{1-20}$ hydrocarbon group), (3) a curable composition (III), wherein the component (B) is a polyoxyalkylene plasticizer (B3) that does not have an —$NH_2$ group at a molecular chain end, and contains as an essential component an ethylene oxide-propylene oxide copolymer (b3) having a molecular weight of 100 to 4500 and having an —OH group and/or a group represented by the formula (7) at a molecular chain end:

—$OR^9$ (wherein $R^9$ is a substituted or unsubstituted $C_{1-20}$ hydrocarbon group), and (4) a curable composition (IV), wherein the component (B) is a plasticizer (B4) that contains as an essential component:
a polyoxyalkylene (b4) having a molecular weight of 300 to 10000 and having a group represented by the formula (8) at partial or all molecular chain ends:

—$NR^{10}_2$ (wherein $R^{10}$ is each independently a hydrogen atom, or a substituted or unsubstituted $C_{1-20}$ hydrocarbon group), whose main chain contains 40 wt % or more of an oxypropylene-derived repeating unit, and
a polyoxyalkylene (b5) having an —OH group and/or a group represented by the formula (7) at a molecular chain end:

—$OR^9$ (wherein $R^9$ is a substituted or unsubstituted $C_{1-20}$ hydrocarbon group).

The present invention desirably relates to a cured product in a membrane form having a thickness of 0.005 to 0.05 inch, and obtained by curing the curable composition.

The cured product desirably has a moisture permeability of 0.4 perm·inch or more according to ASTM E96 (wet cup method).

The cured product more desirably has a moisture permeability of 0.6 perm·inch or more according to ASTM E96 (wet cup method).

The cured product more desirably has a moisture permeability of 0.8 perm·inch or more according to ASTM E96 (wet cup method).

One desirable embodiment of the present invention is a liquid-applied moisture-permeable waterproofing method of a building by using the cured product.

One desirable embodiment of the present invention is a liquid-applied moisture-permeable waterproofing method of a substrate of an exterior wall of a building by using the cured product.

One desirable embodiment of the present invention is a liquid-applied moisture-permeable waterproofing method around an opening of a building by using the cured product.

One desirable embodiment of the present invention is a liquid-applied moisture-permeable waterproofing method of a roof of a building by using the cured product.

One desirable embodiment of the present invention is a liquid-applied moisture-permeable waterproofing material intended to be applied to a building, the waterproofing material comprising the cured product.

One desirable embodiment of the present invention is a liquid-applied moisture-permeable waterproofing material intended to be applied to a substrate of an exterior wall, the waterproofing material comprising the cured product.

One desirable embodiment of the present invention is a liquid-applied moisture-permeable waterproofing material intended to be applied around an opening of a building, the waterproofing material comprising the cured product.

One desirable embodiment of the present invention is a liquid-applied moisture-permeable waterproofing material intended to be applied to a roof of a building, the waterproofing material comprising the cured product.

The polyoxyalkylene polymer of the component (A) is desirably a polyoxypropylene polymer.

The polyoxyalkylene (b2) desirably has a molecular weight of 100 to 4500.

The polyoxyalkylene (b2) desirably has a molecular weight of 200 to 450.

The main chain of the polyoxyalkylene (b2) is desirably a polyoxypropylene homopolymer (b6).

The polyoxyalkylene plasticizer of the component (B2) desirably further comprises an ethylene oxide-propylene oxide copolymer (b3) that has a molecular weight of 100 to 4500 and has an —OH group and/or a group represented by the formula at a molecular chain end:

—OR$^9$ (wherein R$^9$ is as defined in the preceding claims).

The ethylene oxide-propylene oxide copolymer (b3) of the component (B2) desirably has both an —OH group and a group represented by the formula (7) at a molecular chain end:

—OR$^9$ (wherein R$^9$ is as defined in the preceding claims).

wherein an ethylene oxide-propylene oxide copolymer (b3) of the component (B3) has an —OH group and a group represented by the formula (7) at a molecular chain end:

—OR$^9$ (wherein R$^9$ is as defined in the preceding claims).

The polyoxyalkylene plasticizer of the component (B3) desirably further comprises a polyoxypropylene homopolymer (b7) having a molecular weight of 100 to 4500 and having an OH group at all molecular chain ends.

A molecular chain end of the component (b4) is desirably an —NH$_2$ group.

The curable composition desirably further comprises, with respect to 100 parts by weight of the component (A), 3 to 10 parts by weight of an amine compound (C) represented by the formula (9):

NR$^{11}_3$ (9)

(wherein R$^{11}$ is each independently a hydrogen atom, or a substituted or unsubstituted C$_{1-20}$ hydrocarbon group.)

An amine compound (C) is desirably a primary amine compound represented by the formula (10):

R$^{12}$NH$_2$ (10)

(wherein R$^{12}$ is a substituted or unsubstituted C$_{1-20}$ hydrocarbon group).

The curable composition desirably further comprises 4 to 10 parts by weight of an amino group-containing silane coupling agent (D) with respect to 100 parts by weight of the component (A).

The curable composition desirably has a moisture permeability of 0.4 perm·inch or more according to ASTM E96 (wet cup method).

The curable composition more desirably has a moisture permeability of 0.6 perm·inch or more according to ASTM E96 (wet cup method).

The curable composition more desirably has a moisture permeability of 0.8 perm·inch or more according to ASTM E96 (wet cup method).

One desirable embodiment of the present invention is a liquid-applied moisture-permeable waterproofing material intended to be applied to a building, the waterproofing material comprising the curable composition.

One desirable embodiment of the present invention is a liquid-applied moisture-permeable waterproofing material intended to be applied to a substrate of an exterior wall, the waterproofing material comprising the curable composition.

One desirable embodiment of the present invention is a liquid-applied moisture-permeable waterproofing material intended to be applied around an opening of a building, the waterproofing material comprising the curable composition.

One desirable embodiment of the present invention is a liquid-applied moisture-permeable waterproofing material intended to be applied to a roof of a building, the waterproofing material comprising the curable composition.

Effect of the Invention

Use of the liquid-applied moisture-permeable waterproofing material makes it possible to improve energy efficiency and durability of a building and to improve indoor air quality

DETAILED DESCRIPTION OF THE INVENTION

In the following, the present invention is described in detail.

The reactive silicon group to be contained in the polyoxyalkylene polymer having a reactive silicon group is a group having a hydroxy or hydrolyzable group bonded to a silicon atom and capable of crosslinking by forming a siloxane bond by reaction accelerated by a silanol condensation catalyst. The reactive silicon group may include a group represented by the formula (1):

—SiR$^1_{3-a}$X$_a$ (1)

(wherein R$^1$ independently represents a C$_{1-20}$ alkyl group, a C$_{6-20}$ aryl group, a C$_{7-20}$ aralkyl group, or a triorganosiloxy group defined as (R')$_3$SiO— (the respective substituents R' are independently a substituted or unsubstituted C$_{1-20}$ hydrocarbon group); the respective substituents X independently represent a hydroxy or hydrolyzable group; and a represents 1, 2, or 3).

The hydrolyzable group is not particularly limited and may include any conventionally known hydrolyzable group. In particular, examples include a hydrogen atom, a halogen atom, an alkoxy, acyloxy, ketoxymate, amino, amido, acid amido, aminooxy, mercapto, alkenyloxy, and the like groups. Of them, a hydrogen atom, an alkoxy, acyloxy, keoxymate, amino, amido, aminooxy, mercapto, and alkenyloxy groups are desirable, and in terms of moderate hydrolysability and handling easiness, an alkoxy group is particularly desirable. The reactive silicon-containing groups for polyoxyalkylene polymer (A) may be terminal groups represented by —CH$_2$CH$_2$CH$_2$—SiCH$_3$(OCH$_3$)$_2$ or —CH$_2$CH$_2$CH$_2$—Si(OCH$_3$)$_3$.

One silicon atom can contain one to three hydrolyzable groups and hydroxy groups, and can desirably contain two or three groups thereof from the curability viewpoint. In the case where two or more hydrolyzable groups and hydroxy groups are bonded to a silicon atom, they may be the same or different. Reactive silicon groups having three hydroxy and/or hydrolyzable groups on the silicon atom are desirable because, when they are used, high activity and good curability can be attained and, further, the resulting cured products are excellent in recovery, durability and creep resistance. On the other hand, reactive silicon groups having two hydroxy and/or hydrolyzable groups on the silicon atom are desirable from the viewpoint that good storage stability can be attained and that the cured products obtained show high elongation and high strength.

Specific examples of $R^1$ in the above-mentioned formula (1) include alkyl groups such as a methyl group and an ethyl group; cycloalkyl groups such as a cyclohexyl group; aryl groups such as a phenyl group; aralkyl groups such as a benzyl group; and triorganosiloxy groups defined as $(R')_3SiO—$ (wherein R' represents methyl, phenyl, or the like group). Of them, a methyl group is particularly desirable.

Specific examples of the reactive silicon group include a trimethoxysilyl group, a triethoxysilyl group, a triisopropoxysilyl group, a dimethoxymethylsilyl group, a diethoxymethylsilyl group, and a diisopropoxymethylsilyl group. A trimethoxysilyl group, a triethoxysilyl group, and a dimethoxymethylsilyl group are desirable, and a trimethoxysilyl group is particularly desirable, because high activity and good curability can be obtained.

From a viewpoint of storage stability, a dimethoxymethylsilyl group is particularly desirable. A triethoxysilyl group and a diethoxymethylsilyl group are particularly desirable because the alcohol to be produced by hydrolysis of the reactive silicon group is ethanol and thus it is safer.

Introduction of the reactive silicon group may be carried out by a conventionally known method. That is, the following methods may be employed.

(A) A polyoxyalkylene polymer having an unsaturated group is obtained by causing reaction of a polyoxyalkylene polymer having a functional group such as a hydroxy group in a molecule with an organic compound having an active group reactive on the functional group and an unsaturated group. Alternatively, the polyoxyalkylene polymer having an unsaturated group is obtained by copolymerization with an unsaturated group-containing epoxy compound. Subsequently, hydrosilylation is carried out by causing reaction of a hydrosilane having a reactive silicon group on the obtained reaction product.

(B) A compound having a mercapto group and a reactive silicon group is reacted with the polyoxyalkylene polymer having an unsaturated group obtained in the same manner as in the method (A).

(C) A polyoxyalkylene polymer having a functional group such as a hydroxy group, an epoxy group, and an isocyanato group in a molecule is reacted with a compound having a functional group reactive on the functional group and a reactive silicon group.

The method described as the method (A) and the method of causing reaction of a polymer having a terminal hydroxy group and a compound having an isocyanato group and a reactive silicon group in the method (C) are desirable among the above-exemplified methods because they are suitable for achieving high conversion efficiency in a relatively short reaction time. The polyoxyalkylene polymer having a reactive silicon group obtained by the method (A) can give a curable composition with lower viscosity and better workability than those of the polyoxyalkylene polymer obtained by the method (C) and the polyoxyalkylene polymer obtained by the method (B) has strong odor due to mercaptosilane and accordingly, the method (A) is particularly desirable.

Specific examples of the hydroxysilane compound to be used in the method (A) include halogenated silanes such as trichlorosilane, methyldichlorosilane, dimethylchlorosilane, and phenyldichlorosilane; alkoxysilanes such as trimethoxysilane, triethoxysilane, methyldiethoxysilane, methyldimethoxysilane, phenyldimethoxysilane and 1-[2-(trimethoxysilyl)ethyl]-1,1,3,3-tetramethyldisiloxane; acyloxysilanes such as methyldiacetoxysilane and phenyldiacetoxysilane; and ketoximatosilanes such as bis(dimethylketoximato)methylsilane and bis(cyclohexylketoximato)methylsilane, and the examples thereof are not limited to them. Of them, halogenated silanes and alkoxysilanes are desirable, and alkoxysilanes are particularly desirable because the curable composition to be obtained has moderate hydrolysability and is easy to handle. Of the alkoxysilanes, methyldimethoxysilane is particularly desirable because it is easily available and the curable composition comprising the polyoxyalkylene polymer to be obtained therefrom is excellent in the curability, storage stability, elongation property, and tensile strength. Trimethoxysilane is particularly desirable from the viewpoint of excellent curability and recovery of the cured product to be obtained.

As the synthesis method (B), there may be mentioned, for example, a method of introducing a compound having a mercapto group and a reactive silicon group into an unsaturated bond site of a polyoxyalkylene polymer by radical addition reaction in the presence of a radical initiator and/or a radical source; and it is not particularly limited. Specific examples of the compound having a mercapto group and a reactive silicon group include γ-mercaptopropyltrimethoxysilane, γ-mercaptopropylmethyldimethoxysilane, γ-mercaptopropyltriethoxysilane, γ-mercaptopropylmethyldiethoxysilane, mercaptomethyltrimethoxysilane, and mercaptomethyltriethoxysilane; and it is not limited to them.

A method for causing reaction of a polymer having a terminal hydroxy group and a compound having an isocyanato group and a reactive silicon group as the synthesis method (C) may be, for example, the method disclosed in the Japanese Kokai Publication H3-47825, and the method is not particularly limited. Specific examples of the compound having an isocyanato group and a reactive silicon group include γ-isocyanatopropyltrimethoxysilane, γ-isocyanatopropylmethyldimethoxysilane, γ-isocyanatopropyltriethoxysilane, γ-isocyanatopropylmethyldiethoxysilane, isocyanatomethyltrimethoxysilane, isocyanatomethyltriethoxysilane, isocyanatomethyldimethoxymethylsilane, and isocyanatomethyldiethoxymethylsilane, and are not limited to them.

In the case of using a silane compound such as trimethoxysilane having three hydrolyzable groups bonded to one silicon atom, disproportionation reaction is sometimes promoted. If the disproportionation reaction is promoted, a rather harmful compound such as dimethoxysilane and tetrahydrosilane is generated. However, in the case of using γ-mercaptopropyltrimethoxysilane or γ-isocyanatopropyltrimethoxysilane, such disproportionation reaction is not promoted. Therefore, the synthesis method (B) or (C) is desirably employed in the case where a group, such as a trimethoxysilyl group, having three hydrolyzable groups bonded to one silicon atom is used as the silicon-containing group.

On the other hand, the silane compound represented by the formula (2):

$$H—(SiR^2{}_2O)_mSiR^2{}_2—R^3—SiX_3 \qquad (2)$$

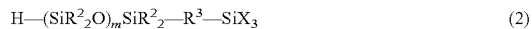

(wherein X is as defined above, the (2×m+2) $R^2$ groups each independently are a hydrocarbon group or a triorganosiloxy group represented by $—OSi(R'')_3$ (in which each R'' independently is a substituted or unsubstituted $C_{1-20}$ hydrocarbon group), desirably a $C_{1-20}$ hydrocarbon group, more desirably a $C_{1-8}$ hydrocarbon group, and particularly desirably a $C_{1-4}$ hydrocarbon group from the availability and cost viewpoint, $R^3$ is a divalent organic group, desirably a divalent $C_{1-12}$ hydrocarbon group, more desirably a divalent $C_{2-8}$ hydrocarbon group, and particularly desirably a divalent $C_2$ hydrocarbon group from the availability and cost viewpoint, and m is an integer of 0 to 19, desirably 1 from the availability and cost viewpoint) do not undergo disproportionation. Therefore, the use of a silane compound represented by the formula (2) is desirable in introducing a group containing a silicon atom with three hydrolyzable groups bound thereto according to the synthesis method (A). Specific examples of the silane compound represented by the formula (2) are 1-[2-(trimethoxysilyl)ethyl]-1,1,3,3-tetramethyldisiloxane, 1-[2-(trimethoxysilyl)propyl]-1,1,3,3-tetramethyldisiloxane, and 1-[2-(trimethoxysilyl)hexyl]-1,1,3,3-tetramethyldisiloxane.

The polyoxyalkylene polymer having a reactive silicon group may have a linear or branched structure. The polymer has a number average molecular weight on the basis of conversion into polystyrene by GPC desirably in a range from 500 to 100,000, more desirably in a range from 1,000 to 50,000, and further desirably in a range from 3,000 to 30,000. When the number average molecular weight is lower than 500, the cured product tends to be undesirable in terms of the elongation property of the cured product; and when it exceeds 100,000, the workability thereof tends to become undesirable because of high viscosity.

To obtain a rubbery cured product with high strength, high elongation and low modulus of elasticity, the average number of reactive silicon groups contained per one molecule of the polyoxyalkylene polymer is at least one and more desirably 1.1 to 5. When the average number of reactive silicon groups contained in a molecule is lower than 1, the curability is insufficient and it is difficult to obtain good rubber elastic behavior. The reactive silicon group may be at either a main chain end or a side chain end of the polyoxyalkylene polymer molecular chain or both. Particularly, in the case where the reactive silicon group exists at a main chain end of the molecular chain, the molecular length among the crosslinking points of the polyoxyalkylene polymer component contained in the cured product to be obtained finally is lengthened and the rubbery cured product makes easy to obtain the rubbery cured product having high strength, high elongation, and low modulus of elasticity.

The above-mentioned polyoxyalkylene polymer is substantially a polymer containing of a repeating unit represented by the formula (3):

$$—R^4—O— \quad (3)$$

(wherein $R^4$ represents a linear or branched $C_{1-14}$ alkylene group) and $R^4$ in the formula (3) is a linear or branched alkylene group having desirably 1 to 14 carbon atoms and more desirably 2 to 4 carbon atoms. Specific examples of the repeating unit represented by the formula (3) areas follows;  —CH$_2$O—, —CH$_2$CH$_2$O—, —CH$_2$CH(CH$_3$)O—, —CH$_2$CH(C$_2$H$_5$)O—, —CH$_2$C(CH$_3$)$_2$O—, and —CH$_2$CH$_2$CH$_2$CH$_2$O—. The main chain of the polyoxyalkylene polymer may contain only one kind of repeating unit or two or more kinds of repeating units. Particularly, in the case of using it for a sealant, etc., a polymer containing a propylene oxide polymer as a main component is desirable because it is amorphous and has a relatively low viscosity.

Examples of a synthesis method of the polyoxyalkylene polymer may include: a polymerization method using an alkaline catalyst such as KOH, a polymerization method using a transition metal compound-porphyrin complex catalyst obtained by causing reaction of an organic aluminum compound and porphyrin as disclosed in Japanese Kokai Publication S61-215623; a polymerization method using a composite metal cyanide complex catalyst disclosed in Japanese Kokoku Publication S46-27250, Japanese Kokoku Publication S59-15336, U.S. Pat. No. 3,278,457, U.S. Pat. No. 3,278,458, U.S. Pat. No. 3,278,459, U.S. Pat. No. 3,427,256, U.S. Pat. No. 3,427,334, and U.S. Pat. No. 3,427,335 etc.; a polymerization method using a catalyst containing a polyphosphazene salt exemplified in Japanese Kokai Publication H10-273512; and a polymerization method using a catalyst containing a phosphazene compound exemplified in Japanese Kokai Publication H11-060722, and it is not limited to these examples.

A production method of a polyoxyalkylene polymer having a reactive silicon group may include those proposed in Japanese Kokoku Publication S45-36319, Japanese Kokoku Publication S46-12154, Japanese Kokai Publication S50-156599, Japanese Kokai Publication S54-6096, Japanese Kokai Publication 555-13767, Japanese Kokai Publication S55-13468, Japanese Kokai Publication S57-164123, Japanese Kokoku Publication H3-2450, U.S. Pat. No. 3,632,557, U.S. Pat. No. 4,345,053, U.S. Pat. No. 4,366,307, and U.S. Pat. No. 4,960,844, etc. Also, polyoxyalkylene polymers having a number average molecular weight of 6,000 or higher and a Mw/Mn ratio of 1.6 or lower and thus having high molecular weight and narrow molecular weight distribution as disclosed in Japanese Kokai Publication S61-197631, Japanese Kokai Publication S61-215622, Japanese Kokai Publication S61-215623, Japanese Kokai Publication S61-218632, Japanese Kokai Publication H3-72527, Japanese Kokai Publication H3-47825, and Japanese Kokai Publication H8-231707 can be exemplified, and is not limited to these examples.

The above-mentioned polyoxyalkylene polymers having a reactive silicon group may be used each alone or two or more of them may be used in combination.

The main chain of the polyoxyalkylene polymer may contain another component such as an urethane bond component in an extent that the effects of the invention is not so significantly adversely affected.

The above-mentioned urethane bond component is not particularly limited and may include a group (hereinafter, also referred to as an amido segment) produced by reaction of an isocyanato group and an active hydrogen group.

The amido segment is a group represented by the formula (4):

$$—NR^5—C(=O)— \quad (4)$$

(wherein $R^5$ represents a hydrogen atom or a monovalent organic group, desirably a substituted or unsubstituted monovalent $C_{1-20}$ hydrocarbon group, and more desirably a substituted or unsubstituted monovalent $C_{1-8}$ hydrocarbon group).

The above-mentioned amido segment may specifically include an urethane group produced by reaction of an isocyanato group and a hydroxy group; an urea group produced by reaction of an isocyanato group and an amino group; and a thiourethane group produced by reaction of an isocyanato group and a mercapto group. Also, in the present invention, groups produced by reaction of an active hydrogen in the above-mentioned urethane group, urea group, and thiourethane group further with an isocyanato group are also included as the group represented by the formula (4).

Examples of methods for industrially easily producing a polyoxyalkylene polymer having an amide segment and a reactive silicon group include those disclosed in Japanese Kokoku Publication S46-12154 (U.S. Pat. No. 3,632,557), Japanese Kokai Publications S58-109529 (U.S. Pat. No. 4,374,237), S62-13430 (U.S. Pat. No. 4,645,816), H8-53528 (EP 0676403), and H10-204144 (EP 0831108), Japanese Kohyo Publication 2003-508561 (U.S. Pat. No. 6,197,912), Japanese Kokai Publications H6-211879 (U.S. Pat. No. 5,364,955), H10-53637 (U.S. Pat. No. 5,756,751), H11-100427, 2000-169544, 2000-169545 and 2002-212415, Japanese Patent No. 3,313,360, U.S. Pat. Nos. 4,067,844 and 3,711,445, Japanese Kokai Publications 2001-323040, H11-279249 (U.S. Pat. No. 5,990,257), 2000-119365 (U.S. Pat.

No. 6,046,270), S58-29818 (U.S. Pat. No. 4,345,053), H3-47825 (U.S. Pat. No. 5,068,304), H11-60724, 2002-155145, and 2002-249538, WO03/018658, WO03/059981, and Japanese Kokai Publication H6-211879 (U.S. Pat. No. 5,364,955), H10-53637 (U.S. Pat. No. 5,756,751), H10-204144 (EP0831108), 2000-169544, 2000-169545, 2000-119365 (U.S. Pat. No. 6,046,270).

The (meth)acrylic ester polymer having a reactive silicon group may be added to the curable composition of the present invention if necessary.

A (meth)acrylic ester monomer composing the main chain of the above-mentioned (meth)acrylic ester polymer is not particularly limited and various monomers may be used. Examples thereof include (meth)acrylic acid monomers such as (meth)acrylic acid, methyl(meth)acrylate, ethyl(meth) acrylate, n-propyl(meth)acrylate, isopropyl(meth)acrylate, n-butyl(meth)acrylate, isobutyl(meth)acrylate, t-butyl(meth) acrylate, n-pentyl(meth)acrylate, n-hexyl(meth)acrylate, cyclohexyl(meth)acrylate, n-heptyl(meth)acrylate, n-octyl (meth)acrylate, 2-ethylhexyl(meth)acrylate, nonyl(meth) acrylate, decyl(meth)acrylate, dodecyl(meth)acrylate, phenyl(meth)acrylate, tolyl(meth)acrylate, benzyl(meth) acrylate, 2-methoxyethyl(meth)acrylate, 3-methoxybutyl (meth)acrylate, 2-hydroxyethyl(meth)acrylate, 2-hydroxypropyl(meth)acrylate, stearyl(meth)acrylate, glycidyl(meth)acrylate, 2-aminoethyl(meth)acrylate, γ-(meth-acryloyloxypropyl)trimethoxysilane, γ-(methacryloyloxypropyl)dimethoxymethylsilane, methacryloyloxymethyltrimethoxysilane, methacryloyloxymethyltriethoxysilane, methacryloyloxymethyldimethoxymethylsilane, methacryloyloxymethyldiethoxymethylsilane, ethylene oxide adduct of (meth)acrylic acid, trifluoromethylmethyl(meth)acrylate, 2-trifluoromethylethyl(meth)acrylate, 2-perfluoroethylethyl(meth)acrylate, 2-perfluoroethyl-2-perfluorobutylethyl(meth)acrylate, perfluoroethyl(meth)acrylate, trifluoromethyl(meth)acrylate, bis(trifluoromethyl)methyl(meth)acrylate, 2-trifluoromethyl-2-perfluoroethylethyl(meth)acrylate, 2-perfluorohexylethyl(meth)acrylate, 2-perfluorodecylethyl(meth)acrylate, and 2-perfluorohexadecylethyl(meth)acrylate. With respect to the (meth)acrylic ester polymer, the following vinyl monomers can be copolymerized together with a (meth)acrylic ester monomer. Examples of the vinyl monomer are styrene monomers such as styrene, vinyltoluene, α-methylstyrene, chlorostyrene, styrenesulfonic acid and its salts; fluorine-containing vinyl monomers such as perfluoroethylene, perfluoropropylene, and vinylidene fluoride; silicon-containing vinyl monomers such as vinyltrimethoxysilane and vinyltriethoxysilane; maleic anhydride, maleic acid, and monoalkyl and dialkyl esters of maleic acid; fumaric acid, and monoalkyl and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile group-containing vinyl monomers such as acrylonitrile and methacrylonitrile; amido group-containing vinyl monomers such as acrylamide and methacrylamide; vinyl esters such as vinyl acetate, vinyl propionate, vinyl pivalate, vinyl benzoate, and vinyl cinnamate; alkenes such as ethylene and propylene; conjugated dienes such as butadiene and isoprene; and vinyl chloride, vinylidene chloride, allyl chloride, and allyl alcohol. They may be used alone or a plurality of them may be copolymerized. Of them, in terms of properties such as the physical properties of a produced material, polymers comprising a styrene monomer and a (meth)acrylic acid monomer are desirable. (Meth) acrylic ester polymers comprising acrylic ester monomers and a methacrylic ester monomer are more desirable and acrylic ester polymers comprising acrylic ester monomers are further desirable. In the case of use for general construction, etc., since physical properties such as low viscosity of a curable composition and low modulus, high elongation, weather resistance, and heat resistance of the membrane, etc. are required, a butyl acrylate monomer is more desirable. On the other hand, in the case of use for an automobile, etc. for which oil-proofness, etc. is required, an ethyl acrylate-based copolymer is more desirable. Since the etyl acrylate-based polymer tends to be slightly inferior in low temperature properties (i.e. cold resistance) although having excellent oil-proofness, a part of ethyl acrylate may be replaced with butyl acrylate in order to improve the low temperature properties. Since the good oil-proofness is lowered as the ratio of butyl acrylate is increased, the ratio is desirably suppressed to 40% or lower and more desirably to 30% or lower for use requiring the oil-proofness. Also, to improve the low temperature properties and the like without deterioration of the oil-proofness, 2-methoxyethyl acrylate, 2-ethoxyethyl acrylate and the like in which oxygen is introduced in an alkyl group in the side chain is desirably used. Since introduction of an alkoxy group having an ether bond in the side chain tends to lower the heat resistance, the ratio is desirably adjusted to 40% or lower when heat resistance is needed. In accordance with the various uses and required aims, the required physical properties such as the oil-proofness, heat resistance, and low temperature properties should be considered and consequently, it is possible to adjust the ratio and obtain suitable polymers. For example, although it is not particularly limited, ethyl acrylate/butyl acrylate/2-methoxyethyl acrylate copolymer [(40 to 50)/(20 to 30)/(30 to 20) ratio by weight] can be exemplified as a polymer with good balance of the physical properties such as the oil-proofness, heat resistance, and low temperature properties. In the present invention, these desirable monomers may be copolymerized with other monomers and also block-copolymerized with them. In that case, these desirable monomers are desirably contained at a ratio of 40% by weight or higher. In the above descriptions, (meth)acrylic acid means acrylic acid and/or methacrylic acid.

A synthesis method of the (meth)acrylic ester polymer is not particularly limited and a conventionally known method may be employed. A polymer obtained by a common free radical polymerization method using an azo compound, a peroxide or the like as a polymerization initiator has a problem that the molecular weight distribution value is generally as high as 2 or higher and the viscosity is thus high. Accordingly, a living radical polymerization method is desirably employed in order to obtain a (meth)acrylic ester polymer having narrow molecular weight distribution and low viscosity and having a crosslinkable functional group at a molecular chain end at a high ratio.

Of the "living radical polymerization methods", an "atom transfer radical polymerization method" for polymerizing a (meth)acrylic ester monomer using an organic halide, a halogenated sulfonyl compound or the like as an initiator and a transition metal complex as a catalyst has, in addition to the characteristics of the above-mentioned "living radical polymerization methods", a wide range of the options of the initiator and the catalyst because a halogen, etc. which is relatively advantageous for the functional group conversion reaction is located at a molecular chain end. The atom transfer radical polymerization method is therefore further desirable as a production method of the (meth)acrylic ester polymer having a specified functional group. Examples of the atom transfer radical polymerization method are, for example, the method disclosed in Matyjaszewski et al., J. Am. Chem. Soc., vol. 117, p. 5614 (1995).

Examples of a production method of the (meth)acrylic ester polymer having a reactive silicon group are production methods employing free radical polymerization methods using chain transfer agents and disclosed in Japanese Kokoku Publication H3-14068, Japanese Kokoku Publication H4-55444, and Japanese Kokai Publication H6-211922. Also, a production method employing an atom transfer radical polymerization method is disclosed in Japanese Kokai Publication H9-272714 and the like; and the method is not limited to these exemplified methods.

The above-mentioned (meth)acrylic ester polymers having a reactive silicon group may be used alone or two or more kinds of them may be used in combination.

A method for producing an organic polymer involving blending a polyoxyalkylene polymer having a reactive silicon group with a (meth)acrylic ester polymer having a reactive silicon group is not particularly limited, and examples thereof include those disclosed in Japanese Kokai Publication S59-122541, S63-11264, H6-172631, and H11-116763. A desirable example of the method for producing an organic polymer is the method by blending polyoxyalkylene polymer having a reactive silicone group with the copolymer comprising a (meth)acrylic ester monomer unit having an $C_{1-8}$ alkyl group and represented by the following formula (5):

$$-CH_2-C(R^6)(COOR^7)- \quad (5)$$

(wherein $R^6$ represents a hydrogen atom or a methyl group; and $R^7$ represents a $C_{1-8}$ alkyl group) and a (meth)acrylic ester monomer unit having an alkyl group of 10 or more carbon atoms and represented by the following formula (6):

$$-CH_2-C(R^6)(COOR^8)- \quad (6)$$

(wherein $R^6$ represents the same as defined above; and $R^8$ represents an alkyl group having 10 or more carbon atoms).

Examples of $R^7$ in the above-mentioned formula (5) are alkyl groups having 1 to 8, desirably 1 to 4, and more desirably 1 or 2 carbon atoms such as a methyl group, an ethyl group, a propyl group, an n-butyl group, a t-butyl group, and a 2-ethylhexyl group. The alkyl group represented by $R^7$ may be used singly, or two or more thereof may be used in combination.

Examples of $R^8$ in the above-mentioned formula (6) are long chain alkyl groups having 10 or more, generally 10 to 30, and desirably 10 to 20 carbon atoms such as a lauryl group, a tridecyl group, a cetyl group, a stearyl group, and a behenyl group. Same as the case of $R^7$, the alkyl group represented by $R^8$ may be used singly, or two or more thereof may be used in combination.

The molecular chain of the (meth)acrylic ester copolymer substantially comprises the monomer units represented by the formulae (5) and (6) and "substantially" here means the total of the monomer units represented by the formulae (5) and (6) contained in the copolymer exceeds 50% by weight. The total of the monomer units represented by the formulae (5) and (6) is desirably 70% by weight or more.

The ratio of the monomer unit represented by the formula (5) and the monomer unit represented by the formula (6) is desirably from (95:5) to (40:60) and more desirably (90:10) to (60:40) on the basis of weight.

The monomer units which may be contained in the copolymer, other than those represented by the formulae (5) and (6), may include acrylic acids such as acrylic acid and methacrylic acid; amido group-containing monomers such as acrylamide, methacrylamide, N-methylolacrylamide, and N-methylolmethacrylamide; epoxy group-containing monomers such as glycidyl acrylate and glycidyl methacrylate; and amino group-containing monomers such as diethylaminoethyl acrylate, diethylaminoethyl methacrylate, and aminoethyl vinyl ether; and monomer units derived from acrylonitrile, styrene, α-methylstyrene, alkyl vinyl ether, vinyl chloride, vinyl acetate, vinyl propionate, and ethylene.

Further, a production method of the polyoxyalkylene polymer obtained by blending the (meth)acrylic ester polymer having a reactive silicon group may also include a method of polymerizing a (meth)acrylic ester monomer in the presence of a polyoxyalkylene polymer having a reactive silicon group. The methods are practically disclosed in Japanese Kokai Publication S59-78223, Japanese Kokai Publication S59-168014, Japanese Kokai Publication S60-228516, and Japanese Kokai Publication S60-228517, and are not particularly limited to them.

In the curable composition of the present invention, used as the component (B) is a polyoxyalkylene plasticizer whose main chain contains 5 wt % or more of an oxypropylene-derived repeating unit and has one or more groups, at an end thereof, selected from the group consisting of an —OH group, a group represented by the formula (7):

$$-OR^9 \quad (7)$$

(wherein $R^9$ is a substituted or unsubstituted $C_{1-20}$ hydrocarbon group), and a group represented by the formula (8):

$$-NR^{10}_2 \quad (8)$$

(wherein $R^{10}$ is each independently a hydrogen atom, or a substituted or unsubstituted $C_{1-20}$ hydrocarbon group).

$R^9$ is not particularly limited, and examples thereof include a methyl group, an ethyl group, a propyl group, a butyl group, a hexyl group, an octyl group, a decyl group, a dodecyl group, a tetradecyl group, a hexadecyl group and an octadecyl group, a phenyl group, an allyl group, a vinyl group, a benzyl group, a chloromethyl group, and a trifluoromethyl group. A butyl group, an octyl group, an octadecyl group, and an allyl group are desirable, and a butyl group is particularly desirable.

$R^{10}$ is not particularly limited, and examples thereof include a hydrogen atom, a methyl group, an ethyl group, a propyl group, a butyl group, a hexyl group, an octyl group, a decyl group, a dodecyl group, a tetradecyl group, a hexadecyl group, an octadecyl group, a phenyl group, an allyl group, a vinyl group, a benzyl group, a chloromethyl group, and a trifluoromethyl group.

The component (B) does not contain a reactive silicon group and plasticizes the component (A). The viscosity and thixotropy of the curable composition of the present invention as well as the mechanical characteristics, such as tensile strength and elongation, of cured products obtained by curing the composition can be adjusted by adding the component (B) to the curable composition.

A synthesis method of the component (B) may include, for example, a polymerization method using an alkaline catalyst such as KOH, a polymerization method using a transition metal compound-porphyrin complex catalyst obtained by causing reaction of an organic aluminum compound and porphyrin as disclosed in Japanese Kokai Publication S61-215623, a polymerization method using a composite metal cyanide complex catalyst disclosed in Japanese Kokoku Publication S46-27250, Japanese Kokoku Publication S59-15336, U.S. Pat. No. 3,278,457, U.S. Pat. No. 3,278,458, U.S. Pat. No. 3,278,459, U.S. Pat. No. 3,427,256, U.S. Pat. No. 3,427,334, and U.S. Pat. No. 3,427,335, etc., a polymerization method using a catalyst containing a polyphosphazene salt exemplified in Japanese Kokai Publication H10-273512, and a polymerization method using a catalyst containing a phosphazene compound exemplified in Japanese Kokai Publication H11-060722, and it is not limited to these examples.

The component (B) is used in an amount of 5 to 200 parts by weight, desirably used in an amount of 10 to 120 parts by weight, and more desirably in an amount of 15 to 70 parts by weight, per 100 parts by weight of the component (A).

When the blending amount of the component (B) is less than the range, a moisture permeability improving effect produced by the component (B) may be insufficient. When the blending amount of the component (B) exceeds the range, physical properties of the cured product tends to be deteriorated.

In the present invention, in the case where the ratio (W2/W1) of the total weight (W2) of the component (A) and the component (B) with respect to the total weight of the curable composition (W1) is a predetermined value, or in the case where a polyoxyalkylene plasticizer having a specific structure is used, it is possible to remarkably improve the moisture permeability of a cured product of the curable composition to be obtained.

Based on the kinds of the component (B), the present invention is divided into four aspects: a curable composition (I) of <the first aspect>; a curable composition (II) of <the second aspect>; a curable composition (III) of <the third aspect>; and a curable composition (IV) of <the fourth aspect>. The polyoxyalkylene polymer of the component (A) can be used in common with the curable composition of each aspect. Various additives other than the component (A) and the component (B) also can be used in common with the curable composition of each aspect.

The following will describe the curable composition of each aspect.

Curable Composition (I) of <the First Aspect>

The curable composition (I) of the first aspect comprises:

(A) a polyoxyalkylene polymer having a silicon-containing group crosslinkable by forming a siloxane bond;

(B) a polyoxyalkylene plasticizer whose main chain contains 5 wt % or more of an oxypropylene-derived repeating unit and has one or more groups, at an end thereof, selected from the group consisting of an —OH group, a group represented by the formula (7):

  (7)

(wherein $R^9$ is a substituted or unsubstituted $C_{1-20}$ hydrocarbon group), and a group represented by the formula (8):

  (8)

(wherein $R^{10}$ is each independently a hydrogen atom, or a substituted or unsubstituted $C_{1-20}$ hydrocarbon group), wherein the component (B) is a polyoxyalkylene plasticizer (B1) that does not have an —NH$_2$ group at a molecular chain end, and contains polyoxyalkylene (b1) that has an —OH group at all molecular chain ends as an essential component, and has a molecular weight of 100 to 4500, and wherein a ratio (W2/W1) of a total weight (W2) of the component (A) and the component (B1) with respect to a total weight of the curable composition (W1) is 51 to 80 wt %.

When W2/W1 is set to the range, it is possible to obtain a curable composition which produces a cured product having excellent moisture permeability and which has sufficient workability upon application.

Here, W2/W1 is required to be 51 to 80 wt %, is desirably 53 to 78 wt %, more desirably 55 to 77 wt %, further desirably 60 to 76 wt %, and particularly desirably 65 to 75 wt %. When W2/W1 is less than the range, the curable composition may have insufficient moisture permeability. On the other hand, when W2/W1 exceeds the range, the composition before curing tends to sag, workability thereof may be deteriorated, and use of them in such amounts is unfavorable in terms of cost.

The main chain of the component (b1) is required to contain 5 wt % or more of an oxypropylene-derived repeating unit of the component (b1), desirably contains 25 wt % or more, more desirably contains 45 wt % or more, further desirably contains 70 wt % or more, and particularly desirably contains 95 wt % or more. Most desirably, all repeating units are oxypropylene. When the oxypropylene-derived repeating unit is less than the range, the plasticizer tends to migrate to the surface of the cured product after curing. The curable composition may include other repeating units in addition to oxypropylene. Examples of the other repeating units include —CH$_2$O—, —CH$_2$CH$_2$O—, —CH$_2$CH(C$_2$H$_5$)O—, —CH$_2$C(CH$_3$)$_2$O—, and —CH$_2$CH$_2$CH$_2$CH$_2$O—. The group —CH$_2$CH$_2$O— is desirable in terms of availability and moisture permeability.

The molecular weight of the component (B1) is calculated by the terminal analysis, and is required to be 100 to 4500, desirably 150 to 3500, more desirably 200 to 2000, further desirably 250 to 1500, and particularly desirably 300 to 1000. When the molecular weight is less than the range, the curability of the curable composition tends to be reduced (curing retardation) after storage, and the plasticizer tends to migrate to the surface of the cured product after curing. On the other hand, when the molecular weight exceeds the range, the viscosity of the curable composition is high, the workability of the curable composition tends to decrease, and the moisture permeability of a cured product of the curable composition to be obtained tends to be reduced.

The component (b1) is required to have an —OH group at all molecular chain ends. When the component (b1) has an —OH group at all molecular chain ends, it is possible to increase an —OH group concentration in the curable composition, and the moisture permeability of a cured product of the curable composition to be obtained tends to be high. Therefore, from the viewpoint of the better moisture permeability of the cured product, a polyoxyalkylene plasticizer with a small molecular weight is desirable. However, when the —OH group concentration is too high, the curability of the curable composition tends to be reduced (curing retardation) after storage. Thus, a polyoxyalkylene plasticizer with a large molecular weight is desirable in terms of curing retardation. In terms of availability, the average number of the end groups of the component (b1) per one molecule of the component (b1) is desirably 2 to 5, more desirably 2 to 3, further desirably 2 to 2.5, and particularly desirably 2 to 2.2.

The amount of the component (b1) in the component (B1) is desirably 50 wt % or more, more desirably 70 wt % or more, and particularly desirably 90 wt % or more in terms of the moisture permeability of a cured product to be obtained.

The component (b1) is used desirably in an amount of 10 parts by weight to 150 parts by weight, more desirably 30 parts by weight to 120 parts by weight, further desirably 50 parts by weight to 100 parts by weight, particularly desirably 60 parts by weight to 90 parts by weight, and most desirably 65 parts by weight to 80 parts by weight, per 100 parts by weight of the component (A). When the component (b1) is used in an amount of less than the range, the curable composition may have insufficient moisture permeability, the viscosity of the composition before curing is high, and workability thereof may be deteriorated. On the other hand, when the component (b1) is used in an amount exceeding the range, physical properties of the cured product of the composition, such as tear strength, may be low.

Various additives other than the component (A) and the component (B) will be described later.

Curable Composition (II) of <the Second Aspect>

The curable composition (II) of the second aspect comprises:

(A) a polyoxyalkylene polymer having a silicon-containing group crosslinkable by forming a siloxane bond;

(B) a polyoxyalkylene plasticizer whose main chain contains 5 wt % or more of an oxypropylene-derived repeating unit and has one or more groups, at an end thereof, selected from the group consisting of an —OH group, a group represented by the formula (7):

$$—OR^9 \qquad (7)$$

(wherein $R^9$ is as defined in the preceding description), and a group represented by the formula (8):

$$—NR^{10}{}_2 \qquad (8)$$

(wherein $R^{10}$ is as defined in the preceding description), wherein the component (B) is a polyoxyalkylene plasticizer (B2) that does not have an —NH$_2$ group at a molecular chain end, and contains a polyoxyalkylene (b2) as an essential component, the polyoxyalkylene (b2) having both an —OH group and a group represented by the formula (7) at a molecular chain end:

$$—OR^9 \qquad (7)$$

(wherein $R^9$ is as defined in the preceding description).

By using a plasticizer that contains polyoxyalkylene (b2) having both an —OH group and —OR$^9$ group as essential components, it is possible to obtain a curable composition which produces a cured product having excellent moisture permeability and shows little curing retardation after storage.

The component (b2) is required to have both an —OH group and an —OR$^9$ group at a molecular chain end. The average number of the end groups of the component (b2) per one molecule of the component (b2) is desirably 2 to 5, more desirably 2 to 3, further desirably 2 to 2.5, and particularly desirably 2 to 2.2.

The molecular weight of the component (b2) is calculated by terminal analysis and required to be 100 to 4500.

The molecular weight is favorably low in terms of the moisture permeability of a cured product. The molecular weight of the component (b2) is desirably 150 to 1000, more desirably 180 to 700, further desirably 200 to 450, and particularly desirably 250 to 400. When the molecular weight is less than the range, the curability of the curable composition tends to be reduced (curing retardation) after storage, and the plasticizer tends to migrate to the surface of the cured product after curing. On the other hand, when the molecular weight exceeds the range, the viscosity of the curable composition is high, the workability of the curable composition tends to decrease, and the moisture permeability of a cured product of the curable composition to be obtained tends to be reduced.

From the viewpoint of the balance between curing retardation and moisture permeability, the molecular weight of the component (b2) is desirably 150 to 3500, more desirably 200 to 2000, and particularly desirably 500 to 1500.

As a method for synthesizing a polyoxyalkylene that has both an OH group and an —OR$^9$ group, there may be mentioned a ring-opening polymerization method of using an alkaline catalyst such as KOH, a metal compound such as ferric chloride, dialkyl zinc, or a composite metal cyanide complex, or a porphyrin complex such as an alkaline metal, as a catalyst for ring-opening polymerization of monoepoxide in the presence of monovalent active hydrogen-containing compounds. Of these, the polymerization method of using an alkaline catalyst or a composite metal cyanide complex is desirable, and the polymerization method of using an alkaline catalyst is more desirable.

Examples of the monoepoxide include: aliphatic alkylene oxides such as ethylene oxide, propylene oxide, 1,2-butylene oxide, 2,3-butylene oxide, and epichlorohydrin; and aromatic alkylene oxides such as styrene oxide. Aliphatic alkylene oxides are desirable, and ethylene oxide or propylene oxide is more desirable, and propylene oxide is particularly desirable.

Examples of monovalent active hydrogen-containing compounds used as an initiator in the above polymerization method include monohydric alcohol, monohydric phenol, monovalent carboxylic acid, and unsaturated group-containing monovalent active hydrogen-containing compounds such as unsaturated alcohol, unsaturated phenol, and unsaturated carboxylic acid. Because of its easy polymerization, monohydric alcohol is desirable, monohydric aliphatic alcohol is more desirable, and monohydric saturated aliphatic alcohol is particularly desirable.

Examples of the monohydric alcohol include: aliphatic alcohols such as methyl alcohol, ethyl alcohol, n-propyl alcohol, isopropyl alcohol, n-butyl alcohol, isobutyl alcohol, t-butyl alcohol, n-amyl alcohol, isoamyl alcohol, n-hexyl alcohol, 2-ethylhexyl alcohol, and allyl alcohol; and aromatic alcohols such as phenol, cresol, octylphenol, nonyl phenol, and benzyl alcohol; and n-butyl alcohol is desirable.

The main chain of the component (b2) is required to contain 5 wt % or more of an oxypropylene-derived repeating unit of the component (b2), desirably contains 45 wt % or more, more desirably contains 70 wt % or more, further desirably contains 85 wt % or more, particularly desirably contains 95 wt % or more. Most desirably, all repeating units are oxypropylene. That is, the main chain of the component (b2) is desirably a polyoxypropylene homopolymer (b6). When the oxypropylene-derived repeating unit is less than the range, the plasticizer tends to migrate to the surface of the cured product after curing. The polyoxyalkylene may include other repeating units in addition to oxypropylene. Examples of the other repeating units include —CH$_2$O—, —CH$_2$CH$_2$O—, —CH$_2$CH(C$_2$H$_5$)—CH$_2$C(CH$_3$)$_2$O—, and —CH$_2$CH$_2$CH$_2$CH$_2$O—. The group —CH$_2$CH$_2$O— is desirable in terms of availability and moisture permeability.

The component (b2) is used desirably in an amount of 10 to 150 parts by weight, more desirably in an amount of 30 to 120 parts by weight, further desirably 50 to 100 parts by weight, particularly desirably 60 to 90 parts by weight, and most desirably 65 to 80 parts by weight, per 100 parts by weight of the component (A). When the component (b2) is used in an amount of less than the range, the curable composition may have insufficient moisture permeability, the viscosity of the composition before curing is high, and workability thereof may be deteriorated. On the other hand, when the component (b2) is used in an amount exceeding the range, physical properties of the cured product of the composition, such as tear strength, may be low.

In terms of moisture permeability of the cured product, the polyoxyalkylene plasticizer of the component (B2) desirably comprises:

the polyoxypropylene homopolymer (b6) that has a molecular weight of 100 to 4500 and has both an —OH group and a group represented by the formula (7) at a molecular chain end:

$$—OR^9 \qquad (7)$$

(wherein $R^9$ is as defined in the preceding description);

and an ethylene oxide-propylene oxide copolymer (b3) that has a molecular weight of 100 to 4500 and has an —OH group and/or a group represented by the formula (7) at a molecular chain end:

$$-OR^9 \qquad (7)$$

(wherein $R^9$ is as defined in the preceding description).

By using a plasticizer that contains an ethylene oxide-propylene oxide copolymer (b3) as an essential component, it is possible to obtain a curable composition which produces a cured product having excellent moisture permeability and shows little curing retardation after storage. The plasticizer may include other repeating units in addition to ethylene oxide and propylene oxide. Examples of the other repeating units include —CH$_2$O—, —CH$_2$CH(C$_2$H$_5$)O—, —CH$_2$C(CH$_3$)$_2$O—, and —CH$_2$CH$_2$CH$_2$CH$_2$O—.

The molecular weight of the component (b3) is calculated by terminal analysis and required to be 100 to 4500, and the molecular weight of the component (b3) is desirably 150 to 3500, more desirably 200 to 2000, and particularly desirably 500 to 1500. When the molecular weight is less than the range, the curability of the curable composition tends to be reduced after storage (curing retardation), and the plasticizer tends to migrate to the surface of the cured product after curing. On the other hand, when the molecular weight exceeds the range, the viscosity of the curable composition is high. Then, the workability of the curable composition tends to decrease, and the moisture permeability of a cured product of the curable composition to be obtained tends to be reduced.

In terms of the moisture permeability of a cured product to be obtained, the component (b3) desirably has an —OH group at all molecular chain ends, or desirably has both an —OH group and an —OR$^9$ group at the molecular chain ends. When the —OH group concentration is high, the curability of the curable composition tends to be reduced (curing retardation) after storage, and the plasticizer tends to migrate to the surface of the cured product after curing. In terms of curing retardation and migration of the plasticizer to the surface of the cured product, the component (b3) desirably has both an —OH group and an —OR$^9$ group at the molecular chain ends. In terms of availability, the average number of the end groups of the component (b3) per one molecule of the component (b3) is desirably 2 to 5, more desirably 2 to 3, further desirably 2 to 2.5, and particularly desirably 2 to 2.2.

The higher the number of oxyethylene units in the component (b3) is, the higher the moisture permeability of a cured product of the curable composition to be obtained tends to be. The ratio of the repeating units derived from ethylene oxide and propylene oxide in the main chain of the component (b3) is not particularly limited, and is desirably 10/90 to 90/10 (in weight ratio), more desirably 20/80 to 80/20 (in weight ratio), and particularly desirably 35/65 to 65/35 (in weight ratio).

The mixing ratio of the component (b6) and the component (b3) is not particularly limited, and is desirably 5/95 to 90/10 (in weight ratio), more desirably 10/90 to 80/20 (in weight ratio), and particularly desirably 20/80 to 60/40 (in weight ratio).

The mixture of the component (b6) and the component (b3) is used desirably in an amount of 10 to 150 parts by weight, more desirably in an amount of 30 to 120 parts by weight, further desirably 50 to 100 parts by weight, particularly desirably 60 to 90 parts by weight, and most desirably 65 to 80 parts by weight, per 100 parts by weight of the component (A). When the mixture of the component (b6) and the component (b3) is used in an amount of less than the range, the curable composition may have insufficient moisture permeability, and the viscosity of the composition before curing is high, and workability thereof may be deteriorated. On the other hand, when the mixture of the component (b6) and the component (b3) is used in an amount exceeding the range, physical properties of the cured product of the composition, such as tear strength, may be low.

The ratio (WAB2/W) of the total weight (WAB2) of the component (A) and the component (B2) with respect to the total weight of the curable composition (W) is desirably 35 to 80 wt %, more desirably 50 to 77 wt %, further desirably 55 to 76 wt %, and particularly desirably 60 to 75 wt %. When WAB2/W is less than the range, the curable composition may have insufficient moisture permeability. On the other hand, when WAB2/W exceeds the range, the composition before curing tends to sag, workability thereof may be deteriorated, and use of them in such amounts is unfavorable in terms of cost.

Various additives other than the component (A) and the component (B) will be described later.

Curable Composition (III) of <The Third Aspect>

The curable composition (III) of the third aspect comprises:

(A) a polyoxyalkylene polymer having a silicon-containing group crosslinkable by forming a siloxane bond;

(B) a polyoxyalkylene plasticizer whose main chain contains 5 wt % or more of an oxypropylene-derived repeating unit and has one or more groups, at an end thereof, selected from the group consisting of an —OH group, a group represented by the formula (7):

$$-OR^9 \qquad (7)$$

(wherein $R^9$ is as defined in the preceding description), and a group represented by the formula (8):

$$-NR^{10}_2 \qquad (8)$$

(wherein $R^{10}$ is as defined in the preceding description), wherein the component (B) is a polyoxyalkylene plasticizer (B3) that does not have an —NH$_2$ group at a molecular chain end, and contains as an essential component an ethylene oxide-propylene oxide copolymer (b3) having a molecular weight of 100 to 4500 and having an —OH group and/or a group represented by the formula (7) at a molecular chain end:

$$-OR^9 \qquad (7)$$

(wherein $R^9$ is as defined in the preceding description).

By using a plasticizer that contains an ethylene oxide-propylene oxide copolymer (b3) as an essential component, it is possible to obtain a curable composition which produces a cured product having excellent moisture permeability and shows little curing retardation after storage. The plasticizer may include other repeating units in addition to ethylene oxide and propylene oxide. Examples of the other repeating units include —CH$_2$O—, —CH$_2$CH(C$_2$H$_5$)O—, —CH$_2$C(CH$_3$)$_2$O—, and —CH$_2$CH$_2$CH$_2$CH$_2$O—.

The molecular weight of the component (b3) is calculated by terminal analysis and required to be 100 to 4500. The molecular weight of the component (b3) is desirably 150 to 3500, more desirably 200 to 2000, and particularly desirably 500 to 1500. When the molecular weight is less than the range, the curability of the curable composition tends to be reduced (curing retardation) after storage, and the plasticizer tends to migrate to the surface of the cured product after curing. On the other hand, when the molecular weight exceeds the range, the viscosity of the curable composition is high, the workability of the curable composition tends to decrease, and the moisture permeability of a cured product of the curable composition to be obtained tends to be reduced.

In terms of the moisture permeability of a cured product of the curable composition to be obtained, the component (b3) desirably has an —OH group at all molecular chain ends, or desirably has both an —OH group and an —OR$^9$ group at the molecular chain ends. When the —OH group concentration is high, the curability of the curable composition tends to be reduced after storage (curing retardation), and the plasticizer tends to migrate to the surface of the cured product after curing. In terms of curing retardation and migration of the plasticizer to the surface of the cured product, the component (b3) desirably has both an —OH group and an —OR$^9$ group at the molecular chain ends. In terms of availability, the average number of the end groups of the component (b3) per one molecule of the component (b3) is desirably 2 to 5, more desirably 2 to 3, further desirably 2 to 2.5, and particularly desirably 2 to 2.2.

The higher the number of oxyethylene units in the component (b3) is, the higher the moisture permeability of a cured product of the curable composition to be obtained tends to be. The ratio of the repeating units derived from ethylene oxide and propylene oxide in the main chain of the component (b3) is not particularly limited, and is desirably 10/90 to 90/10 (in weight ratio), more desirably 20/80 to 80/20 (in weight ratio), and particularly desirably 35/65 to 65/35 (in weight ratio).

The component (b3) is used desirably in an amount of 10 parts by weight to 150 parts by weight, more desirably in an amount of 30 parts by weight to 120 parts by weight, further desirably 50 parts by weight to 100 parts by weight, particularly desirably 60 parts by weight to 90 parts by weight, and most desirably 65 parts by weight to 80 parts by weight, per 100 parts by weight of the component (A). When the component (b3) is used in an amount of less than the range, the curable composition may have insufficient moisture permeability, and the viscosity of the composition before curing is high, and workability thereof may be deteriorated. On the other hand, when the component (b3) is used in an amount exceeding the range, physical properties of the composition of the cured product, such as tear strength, may be low.

In terms of migration of the plasticizer to the surface of the cured product, the polyoxyalkylene plasticizer of the component (B3) desirably comprises:

the ethylene oxide-propylene oxide copolymer (b3) that has a molecular weight of 100 to 4500 and has an —OH group and/or a group represented by the formula (7) at a molecular chain end:

$$—OR^9 \qquad (7)$$

(wherein R$^9$ is as defined in the preceding description);

and an polyoxypropylene homopolymer (b7) that has a molecular weight of 100 to 4500 and has an —OH group at all molecular chain ends.

The molecular weight of the component (b7) is calculated by terminal analysis and required to be 100 to 4500. The molecular weight of the component (b7) is desirably 300 to 3500, more desirably 500 to 2500, and particularly desirably 700 to 1500. When the molecular weight is less than the range, the curability of the curable composition tends to be reduced (curing retardation) after storage, and the plasticizer tends to migrate to the surface of the cured product after curing. On the other hand, when the molecular weight exceeds the range, the viscosity of the curable composition is high, the workability of the curable composition tends to decrease, and the moisture permeability of a cured product of the curable composition to be obtained tends to be reduced.

The component (b7) is required to have an —OH group at all molecular chain ends. When the component (b7) has an —OH group at all molecular chain ends, it is possible to increase an —OH group concentration in the curable composition, the moisture permeability of a cured product of the curable composition to be obtained tends to be high. Therefore, from the viewpoint of the moisture permeability of the cured product, a polyoxyalkylene plasticizer with a small molecular weight is desirable. However, when the —OH group concentration is high, the curability of the curable composition tends to be reduced (curing retardation) after storage. Thus, a polyoxyalkylene plasticizer with a large molecular weight is desirable in terms of curing retardation. In terms of availability, the average number of the end groups of the component (b7) per one molecule of the component (b7) is desirably 2 to 5, more desirably 2 to 3, further desirably 2 to 2.5, and particularly desirably 2 to 2.2.

The mixing ratio of the component (b3) and the component (b7) is not particularly limited, and is desirably 10/90 to 90/10 (in weight ratio), more desirably 20/80 to 80/20 (in weight ratio), and particularly desirably 35/65 to 65/35 (in weight ratio).

The mixture of the component (b3) and the component (b7) is used desirably in an amount of 10 parts by weight to 150 parts by weight, more desirably in an amount of 30 parts by weight to 120 parts by weight, further desirably 50 parts by weight to 100 parts by weight, particularly desirably 60 parts by weight to 90 parts by weight, and most desirably 65 parts by weight to 80 parts by weight, per 100 parts by weight of the component (A). When the mixture of the component (b3) and the component (b7) is used in an amount of less than the range, the curable composition may have insufficient moisture permeability, and the viscosity of the composition before curing is high, and workability thereof may be deteriorated. On the other hand, when the mixture of the component (b3) and the component (b7) is used in an amount exceeding the range, physical properties of the composition of the cured product, such as tear strength, may be low.

The ratio (WAB3/W) of the total weight (WAB3) of the component (A) and the component (B3) with respect to the total weight of the curable composition (W) is desirably 35 to 80 wt %, more desirably 50 to 77 wt %, further desirably 55 to 76 wt %, and particularly desirably 60 to 75 wt %. When WAB3/W is less than the range, the curable composition may have insufficient moisture permeability. On the other hand, when WAB3/W exceeds the range, the composition before curing tends to sag, workability thereof may be deteriorated, and use of them in such amounts is unfavorable in terms of cost.

Various additives other than the component (A) and the component (B) will be described later.

Curable Composition (IV) of <the Fourth Aspect>

The curable composition (IV) of the fourth aspect comprises:

(A) a polyoxyalkylene polymer having a silicon-containing group crosslinkable by forming a siloxane bond;

(B) a polyoxyalkylene plasticizer whose main chain contains 5 wt % or more of an oxypropylene-derived repeating unit and has one or more groups, at an end thereof, selected from the group consisting of an —OH group, a group represented by the formula (7):

$$—OR^9 \qquad (7)$$

(wherein R$^9$ is as defined in the preceding description), and a group represented by the formula (8):

$$—NR^{10}_2 \qquad (8)$$

(wherein R$^{10}$ is as defined in the preceding description), wherein the component (B) is a plasticizer (B4) that contains as an essential component:

a polyoxyalkylene (b4) having a molecular weight of 300 to 10000 and having a group represented by the formula (8) at partial or all molecular chain ends:

$$—NR^{10}_2 \quad (8)$$

(wherein $R^{10}$ is as defined in the preceding description), whose main chain contains 40 wt % or more of an oxypropylene-derived repeating unit, and a polyoxyalkylene (b5) having an —OH group and/or a group represented by the formula (7) at a molecular chain end:

$$—OR^9 \quad (7)$$

(wherein $R^9$ is as defined in the preceding description).

By using a polyoxyalkylene (b4) having —$NR^{10}_2$ at a molecular chain end, it is possible to obtain a curable composition excellent which gives a cured product having moisture permeability.

When the polyoxyalkylene (b4) having —$NR^{10}_2$ at a molecular chain end is used alone, the viscosity of a curable composition to be obtained tends to remarkably decrease after storage. Thus, it is required to use the polyoxyalkylene (b5) having an —OH group and/or —$OR^9$ at a molecular chain end in combination.

In terms of the moisture permeability of a cured product of the curable composition to be obtained, $R^{10}$s of the —$NR^{10}_2$ group at a molecular chain end of the component (b4) are desirably a hydrogen atom, and more desirably the —$NR^{10}_2$ group is an —$NH_2$ group in which two $R^{10}$s are both hydrogen atoms.

The main chain of the polyoxyalkylene plasticizer is required to contain 40 wt % or more of an oxypropylene-derived repeating unit of the component (b4), desirably contains 60 wt % or more, more desirably contains 80 wt % or more, further desirably contains 90 wt % or more, particularly desirably contains 95 wt % or more. Most desirably, all repeating units are oxypropylene. When the oxypropylene-derived repeating unit is less than the range, the plasticizer tends to migrate to the surface of the cured product after curing. The plasticizer may include other repeating units in addition to oxypropylene. Examples of the other repeating units include —$CH_2O$—, —$CH_2CH_2O$—, —$CH_2CH(C_2H_5)$—$CH_2C(CH_3)_2O$—, and —$CH_2CH_2CH_2CH_2O$—. The group —$CH_2CH_2O$— is desirable in terms of availability and moisture permeability.

The molecular weight of the component (b4) is calculated by the terminal analysis, and is required to be 300 to 10000. The molecular weight is desirably 400 to 4500, more desirably 500 to 3500, and particularly desirably 600 to 2500. When the molecular weight is less than the range, the plasticizer tends to migrate to the surface of the cured product after curing. On the other hand, when the molecular weight exceeds the range, the moisture permeability of a cured product of the curable composition to be obtained tends to be reduced.

The component (b4) is required to have an —$NR^{10}_2$ group at partial or all molecular chain ends. When the component (b4) has an —$NR^{10}_2$ group at partial or all molecular chain ends, the moisture permeability of a cured product of the curable composition to be obtained tends to be high. Therefore, from the viewpoint of the moisture permeability of the cured product, a polyoxyalkylene with a small molecular weight is desirable. However, when the —$NR^{10}_2$ group concentration is high, the plasticizer tends to migrate to the surface of the cured product after curing. Thus, a polyoxyalkylene plasticizer with a large molecular weight is desirable in terms of migration of the plasticizer to the surface of the cured product. In terms of availability and migration of the plasticizer, the average number of the end groups of the component (b4) per one molecule of the component (b4) is desirably 2 to 5, more desirably 2 to 3, further desirably 2 to 2.5, and particularly desirably 2 to 2.2.

In terms of the moisture permeability of a cured product of the curable composition to be obtained, the component (b5) desirably has an —OH group at all molecular chain ends, or desirably has both an —OH group and an —$OR^9$ group at the molecular chain ends. When the —OH group concentration is high, the curability of the curable composition tends to be reduced (curing retardation) after storage. In terms of curing retardation and moisture permeability, the component (b5) desirably has both an —OH group and an —$OR^9$ group at the molecular chain ends. In terms of availability and migration of the plasticizer, the average number of the end groups of the component (b5) per one molecule of the component (b5) is desirably 2 to 5, more desirably 2 to 3, further desirably 2 to 2.5, and particularly desirably 2 to 2.2.

The higher the number of oxyethylene units in the component (b5) is, the higher the moisture permeability of a cured product of the curable composition to be obtained tends to be. The main chain of the polyoxyalkylene plasticizer desirably contains 80 wt % or less of an oxyethylene-derived repeating unit of the component (b5), more desirably contains 15 to 75 wt % or more, further desirably contains 20 to 65 wt % or more, particularly desirably contains 25 to 55 wt %. When the oxyethylene-derived repeating unit exceeds the range, the plasticizer tends to migrate to the surface of the cured product after curing. When the oxyethylene-derived repeating unit exceeds the range, the plasticizer tends to migrate to the surface of the cured product after curing. The plasticizer may include other repeating units in addition to ethylene oxide and propylene oxide. Examples of the other repeating units include —$CH_2O$—, —$CH_2CH(C_2H_5)O$—, —$CH_2C(CH_3)_2O$—, and —$CH_2CH_2CH_2CH_2O$—.

The molecular weight of the component (b5) is calculated by terminal analysis. The molecular weight of the component (b5) is desirably 100 to 4500, more desirably 200 to 3000, further desirably 350 to 2000, and particularly desirably 500 to 1500. When the molecular weight is less than the range, the curability of the curable composition tends to be reduced (curing retardation) after storage. On the other hand, when the molecular weight exceeds the range, the viscosity of the curable composition is high, the workability of the curable composition tends to decrease, and the plasticizer tends to migrate to the surface of the cured product after curing.

The mixing ratio of the component (b4) and the component (b5) is not particularly limited, and is desirably 10/90 to 90/10 (in weight ratio), more desirably 20/80 to 80/20 (in weight ratio), and particularly desirably 35/65 to 65/35 (in weight ratio).

The mixture of the component (b4) and the component (b5) is used desirably in an amount of 10 parts by weight to 150 parts by weight, more desirably in an amount of 30 parts by weight to 120 parts by weight, further desirably 50 parts by weight to 100 parts by weight, particularly desirably 60 parts by weight to 90 parts by weight, and most desirably 65 parts by weight to 80 parts by weight, per 100 parts by weight of the component (A). When the mixture of the component (b4) and the component (b5) is used in an amount of less than the range, the curable composition may have insufficient moisture permeability, and the viscosity of the composition before curing is high, and workability thereof may be deteriorated. On the other hand, when mixture of the component (b4) and the component (b5) is used in an amount exceeding the range, physical properties of the composition of the cured product, such as tear strength, may be low.

The ratio (WAB4/W) of the total weight (WAB4) of the component (A) and the component (B4) with respect to the total weight of the curable composition (W) is desirably 35 to 80 wt %, more desirably 50 to 77 wt %, further desirably 55 to 76 wt %, and particularly desirably 60 to 75 wt %. When WAB4/W is less than the range, the curable composition may have insufficient moisture permeability. On the other hand, when WAB4/W exceeds the range, the composition before curing tends to sag, workability thereof may be deteriorated, and use of them in such amounts is unfavorable in terms of cost.

Various additives other than the component (A) and the component (B) will be described later.

<Amine Compound (C)>

For improving the moisture permeability of a cured product of the curable composition of the present invention, an amine compound represented by the formula (9) may be added:

$$NR^{11}_3 \quad (9)$$

(wherein $R^{11}$ is each independently a hydrogen atom, or a substituted or unsubstituted $C_{1-20}$ hydrocarbon group.)

Because of its large moisture permeability improving effect, more desirable is a primary amine compound represented by the formula (10):

$$R^{12}NH_2 \quad (10)$$

(wherein $R^{12}$ is a substituted or unsubstituted $C_{1-20}$ hydrocarbon group).

Specific examples of the amine compound as the component (C) may include: aliphatic primary amines such as methylamine, ethylamine, propylamine, isopropylamine, butylamine, amylamine, hexylamine, octylamine, 2-ethylhexylamine, nonylamine, decylamine, laurylamine, pentadecylamine, cetylamine, stearylamine, and cyclohexylamine; aliphatic secondary amines such as dimethylamine, diethylamine, dipropylamine, diisopropylamine, dibutylamine, diamylamine, dihexylamine, diocylamine, di(2-ethylhexyl) amine, didecylamine, dilaurylamine, dicetylamine, distearylamine, methylstearylamine, ethylstearylamine, and butylstearylamine; aliphatic tertiary amines such as triamylamine, trihexylamine and trioxylamine; aliphatic unsaturated amines such as triallylamine and oleylamine; aromatic amines such as laurylaniline, stearylaniline, and triphenylamine; and other amines such as monoethanolamine, diethanolamine, triethanolamine, 3-hydroxypropylamine, diethylenetriamine, triethylenetetramine, benzylamine, 3-methoxypropylamine, 3-lauryloxypropylamine, 3-dimethylaminopropylamine, and 3-diethylaminopropylamine. The amine compound is not limited to these examples.

Octylamine, laurylamine, etc. are desirable among these in terms of easy availability and low toxicity.

The amine compound of the component (C) is added desirably in an amount of 1 to 20 parts by weight, and more desirably in an amount of 3 to 10 parts by weight. When the blending amount of the amine compound is less than 1 part by weight, a moisture permeability improving effect produced by the amine compound may be insufficient. On the other hand, when the blending amount of the amine compound exceeds 20 parts by weight, physical properties of the cured product tends to be deteriorated.

<Amino Group-Containing Silane Coupling Agent (D)> in the present invention, an amino group-containing silane coupling agent is used as the component (D). The amino group-containing silane coupling agent is a compound that has a hydrolyzable silyl group and an amino group and has the effect of improving the adhesion of the curable composition of the present invention and also improving the moisture permeability of the cured product.

Examples of the reactive silicon group of the amino silane coupling agent may include groups represented by the above-mentioned formula (1) (wherein X is a hydrolyzable group.) Practical examples thereof may be those groups exemplified above for the hydrolyzable group, and methoxy, ethoxy, and the like groups are desirable in terms of the hydrolysis rate. The number of hydrolyzable groups in the molecule is desirably 2 or higher and more desirably 3 or higher. Primary amino groups are more desirable among the amino groups in terms of their high effect of improving the adhesion.

Specific examples of the amino silane coupling agent include γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-(6-aminohexyl)aminopropyltrimethoxysilane, 3-(N-ethylamino)-2-methylpropyltrimethoxysilane, 2-aminoethylaminomethyltrimethoxysilane, N-cyclohexylaminomethyltriethoxysilane, N-cyclohexylaminomethyldiethoxymethylsilane, γ-ureidopropyltrimethoxysilane, γ-ureidopropyltriethoxysilane, N-phenyl-γ-aminopropyltrimethoxysilane, N-phenylaminomethyltrimethoxysilane, N-benzyl-γ-aminopropyltrimethoxysilane, N-vinylbenzyl-γ-aminopropyltriethoxysilane, N,N'-bis[3-trimethoxysilyl]propyl]ethylenediamine, N-cyclohexylaminomethyltrimethoxysilane, N-cyclohexylaminomethyldimethoxymethylsilane, and N-phenylaminomethyltrimethoxysilane.

The component (D) is used in an amount of 1 to 20 parts by weight, and desirably in an amount of 4 to 10 parts by weight, per 100 parts by weight of the component (A). When the blending amount of the component (D) is less than the range, an adhesion improving effect and a moisture permeability improving effect produced by the component (D) may be insufficient. When the blending amount of the component (D) exceeds the range, the elongation of the cured product tends to be low, and the curability in depth of the curable composition tends to be deteriorated.

<Curable Composition>

In the curable composition of the present invention, various compounding agents other than the component (A) and the component (B) may be added according to the target physical properties.

A curing catalyst may be added to the curable composition of the present invention. Specific examples thereof include: metal carboxylates such as tin 2-ethylhexanoate, tin versatate, and bismuth 2-ethylhexanoate; carboxylic acids such as 2-ethylhexanoic acid and versatic acid; tetravalent organic tin compounds such as dibutyltin dilaurate, dibutyltin maleate, dibutyltin phthalate, dibutyltin dioctanoate, dibutyltin bis(2-ethylhexanoate), dibutyltin bis(methylmaleate), dibutyltin bis(ethylmaleate), dibutyltin bis(butylmaleate), dibutyltin bis(octylmaleate), dibutyltin bis(tridecylmaleate), dibutyltin bis(benzylmaleate), dibutyltin diacetate, dioctyltin bis(ethylmaleate), dioctyltin bis(octylmaleate), dibutyltin dimethoxide, dibutyltin bis(nonylphenoxide), dibutyltin oxide, dibutyltin bis(acetylacetonato), dibutyltin bis(ethylacetoacetate), products of the reaction between dibutyltin oxide and a silicate compound, products of the reaction between dialkyltin dicarboxylate, such as dibutyltin dilaurate, and a silicate compound, and products of the reaction between dibutyltin oxide and phthalate ester; organic titanates such as tetraisopropoxytitanium, tetra-n-butoxytitanium, diisopropoxytitanium bis(acetylacetonato), and diisopropoxytitanium bis(ethylacetoacetate); organoaluminium compounds such as aluminum tris(acetylacetonato), aluminum tris(ethylacetoacetate), and diisopropoxy aluminum ethylacetoacetate; zirconium compounds such as zirconium tetrakis(acetylacetonato); aliphatic primary amines such as methylamine, ethylamine, propylamine, isopropylamine, butylamine, amylamine, hexylamine, octylamine, 2-ethylhexylamine, nonylamine, decylamine, laurylamine, pentadecylamine, cetylamine, stearylamine, and cyclohexylamine; aliphatic secondary amines such as dimethylamine, diethylamine, dipropylamine, diisopropylamine, dibutylamine, diamylamine, dihexylamine, dioctylamine, bis(2-ethylhexyl)amine, didecylamine, dilaurylamine, dicetylamine, distearylamine, methylstearylamine, ethylstearylamine, and butylstearylamine; aliphatic tertiary amines such as triamylamine, trihexylamine, and trioctylamine; aliphatic unsaturated amines such as triarylamine and oleylamine; aromatic amines such as laurylaniline, stearylaniline, and triphenylamine; and other amines such as monoethanolamine, diethanolamine, triethanolamine, 3-hydroxypropylamine, diethylenetriamine, triethylenetetramine, benzylamine, 3-methoxypropylamine, 3-lauryloxypropylamine, 3-dimethylaminopropylamine, 3-diethylaminopropylamine, xylylenediamine, ethylenediamine, hexamethylenediamine, triethylenediamine, guanidine, diphenylguanidine, 2,4,6-tris(dimethylaminomethyl)phenol, morpholine, N-methylmorpholine, 2-ethyl-4-methylimidazole, 1,8-diazabicyclo(5,4,0)undecene-7(DBU), and 1,5-diazabicyclo(4,3,0)nonene-5 (DBN).

The curing catalyst is used in an amount of 0.01 to 10 parts by weight, desirably in an amount of 0.1 to 7 parts by weight, and more desirably in an amount of 0.5 to 4 parts by weight, with respect to 100 parts by weight of the component (A).

In the curable composition of the present invention, various silane coupling agents other than the component (D) may be added to the curable composition of the present invention. Specific examples thereof include: isocyanato group-containing silanes such as γ-isocyanatepropyltrimethoxysilane, γ-isocyanatepropyltriethoxysilane, γ-isocyanatepropylmethyldiethoxysilane, γ-isocyanatepropylmethyldimethoxysilane, (isocyanatemethyl)trimethoxysilane, (isocyanatemethyl)dimethoxymethylsilane, (isocyanatemethyl)triethoxysilane, and (isocyanatemethyl)diethoxymethylsilane; ketimine silanes, such as N-(1,3-dimethylbutylidene)-3-(triethoxysilyl)-1-propaneamine; mercapto group-containing silanes such as γ-mercaptopropyltrimethoxysilane, γ-mercaptopropyltriethoxysilane, γ-mercaptpropylmethyldimethoxysilane, γ-mercaptopropylmethyldiethoxysilane, mercaptomethyltrimethoxysilane, and mercaptomethyltriethoxysilane; epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, and β-(3,4-epoxycyclohexyl) ethyltriethoxysilane; carboxysilanes such as β-carboxyethyltriethoxysilane, β-carboxyethylphenylbis(2-methoxyethoxy)silane, and N-β-(carboxymethyl)aminoethyl-γ-aminopropyltrimethoxysilane; vinyl unsaturated group-containing silanes such as vinyltrimethoxysilane, vinyltriethoxysilane, γ-methacryloyloxypropylmethyldimethoxysilane, γ-acryloyloxypropyltriethoxysilane, and methacryloyloxymethyltrimethoxysilane; halogen-containing silanes such as γ-chloropropyltrimethoxysilane; and isocyanurate silanes such as tris(3-trimethoxysilylpropyl)isocyanurate. Utilizable as the silane coupling agents are the derivatives obtained by modifying these, such as amino-modified silyl polymers, silylated amino polymers, unsaturated aminosilane complexes, phenylamino long-chain alkyl silane, amino silylated silicone, and silylated polyester. Products of the reaction between the silane coupling agents may be used as a silane coupling agent, and examples thereof include products of the reaction between the aminosilane and an epoxysilane, products of the reaction between the aminosilane and an isocyanatesilane, and the partial condensate of various silane coupling agents.

The silane coupling agent is used desirably in an amount of 0.1 to 15 parts by weight, more desirably in an amount of 1 to 10 parts by weight, and particularly desirably in an amount of 3 to 7 parts by weight, with respect to 100 parts by weight of the component (A). When the blending amount is less than the range, adhesion and/or storage stability of the curable composition may be insufficient. On the other hand, when the blending amount exceeds the range, membrane formation by the curable composition may be insufficient.

A filler may be added to the curable composition of the present invention. Examples of the filler include: reinforcing fillers such as fumed silica, precipitated silica, crystalline silica, fused silica, dolomite, silicic anhydride, hydrous silicic acid and carbon black; fillers such as ground calcium carbonate, colloidal calcium carbonate, magnesium carbonate, diatomaceous earth, calcined clay, clay, talc, titanium oxide, bentonite, organic bentonite, ferric oxide, fine aluminum powder, flint powder, zinc oxide, activated zinc white, shirasu balloons, glass microballoons, organic microballoons based on a phenol resin or a vinylidene chloride resin, and resin powders such as PVC powder and PMMA powder; and fibrous fillers such as asbestos, glass fibers and filaments. Ground calcium carbonate and colloidal calcium carbonate are desirable in terms of their costs and viscosities of the curable composition.

When a filler is added, the addition level thereof is desirably 1 to 250 parts by weight, and more desirably 10 to 200 parts by weight, per 100 parts by weight of the polymer of the component (A).

Plasticizers other than the component (B) may be added to the curable composition of the present invention. In the present invention, the compound that has a vapor pressure of less than 0.01 KPa at 20° C., is non-reactive with the component (A), and is capable of plasticizing the component (A) is defined as a plasticizer. When the plasticizer is added to the curable composition of the present invention, it is possible to adjust the viscosity and slump properties of the curable composition and the tensile strength, elongation property and like mechanical properties of a membrane to be obtained by curing the curable composition. Examples of the plasticizer include: phthalate esters such as dibutyl phthalate, diheptyl phthalate, di(2-ethylhexyl)phthalate, and butyl benzyl phthalate; nonaromatic dibasic acid esters such as dioctyl adipate, dioctyl sebacate, dibutyl sebacate, and isodecyl succinate; aliphatic esters such as butyl oleate and methyl acetyl ricinoleate; phosphoric acid esters such as tricresyl phosphate and tributyl phosphate; trimellitic acid esters; chlorinated paraffins; hydrocarbon oils such as alkyldiphenyl and partially hydrogenated terphenyl; process oils; and epoxy plasticizers such as epoxidized soybean oil and benzyl epoxystearate.

Polymeric plasticizers other than the component (B) may be used. It is possible to maintain the initial properties of the curable composition for a longer period of time in using of the polymeric plasticizers, in comparison with using a low-molecular-weight plasticizer, a plasticizer that does not contain a polymer component in a molecule. Further, it is possible to improve the drying properties (also referred to as paintability) of an alkyd paint when it is applied to the membrane. The polymeric plasticizer is not particularly restricted but includes: vinyl polymers obtained by polymerization of vinyl monomers by various methods; polyalkylene glycol esters such as diethylene glycol dibenzoate, triethylene glycol dibenzoate and pentaerythritol esters; polyester plasticizers of a dibasic acid such as sebacic acid, adipic acid, azelaic acid and phthalic acid and a dihydric alcohol such as ethylene glycol, diethylene glycol, triethylene glycol, propylene glycol and dipropylene glycol; polystyrenes such as polystyrene and poly-α-methylstyrene; and polybutadiene, polybutene, polyisobutylene, butadiene-acrylonitrile, and polychloroprene.

Of these polymeric plasticizers, those highly compatible with the component (A) are desirable. Vinyl polymers are desirable in this respect. Vinyl polymers are also desirable in terms of compatibility, weather resistance, and heat resistance. Of the vinyl polymers, acrylic polymers and/or methacrylic polymers are more desirable, and such acrylic polymers as polyacrylic acid alkyl esters are further desirable. As the polymer synthesis method, the living radical polymerization method is desirable because of its capability of giving polymers narrow in molecular weight distribution and possibly low in viscosity, and the atom transfer radical polymerization method is more desirable. Also desirable is the method called SGO process and disclosed in Japanese Kokai Publication 2001-207157, which comprises continuously bulk-polymerizing an acrylic acid alkyl ester monomer under high-temperature and high-pressure conditions.

The number average molecular weight of the polymeric plasticizer is desirably 500 to 15000, more desirably 800 to 10000, further desirably 1000 to 8000, particularly desirably 1000 to 5000, and most desirably 1000 to 3000. When the molecular weight of the polymeric plasticizer is too low, the plasticizer may escape with the lapse of time due to heat or rainfall and, as a result, the curable composition cannot maintain the initial physical properties over a long period of time, and the alkyd paintability cannot be improved. On the other hand, when the molecular weight is excessively high, the viscosity of the curable composition will increase and the workability thereof will be poor. The molecular weight distribution of the polymeric plasticizer is not particularly restricted but desirably is narrow, for example narrower than 1.80. It is desirably not wider than 1.70, more desirably not wider than 1.60, still more desirably not wider than 1.50, particularly desirably not wider than 1.40, and most desirably not wider than 1.30.

In the case of vinyl polymers, the number average molecular weight is determined by the GPC method. The molecular weight distribution (Mw/Mn) is measured by the GPC method (on the polystyrene equivalent basis).

The plasticizer to be added may include a single species or a combination of two or more species. It is also possible to add a low-molecular-weight plasticizer and a high-molecular-weight plasticizer in combination. The plasticizer addition may also be made on the occasion of the polymer production.

In the curable composition of the present invention, if necessary, there may be incorporated a thixotropic agent (anti-sagging agent) that prevents the curable composition from sagging and improves the workability thereof. The anti-sagging agent is not particularly restricted but includes: polyamide waxes; hydrogenated castor oil derivatives; and metal soaps such as calcium stearate, aluminum stearate and barium stearate. Further, when those rubber powders having a particle size of 10 to 500 μm which are disclosed in Japanese Kokai Publication H11-349916, and those organic fibers disclosed in Japanese Kokai Publication 2003-155389 are used, it is possible to obtain a curable composition which has high thixotropy and favorable workability. These thixotropic agents (anti-sagging agents) may be used singly or two or more species may be used in combination. The addition level of the thixotropic agent is desirably 0.1 to 20 parts by weight per 100 parts by weight of the polyoxyalkylene polymer (A) having a reactive silicon group.

Various additives may be added to the curable composition of the present invention if necessary. Examples of these additives include photocurable substances, oxygen-curable substances, antioxidants, light stabilizers, ultraviolet absorbers, epoxy resins, epoxy resin curing agents, fire retardants, solvents, curability modifiers, radical inhibitors, metal deactivators, antiozonants, phosphorus peroxide decomposers, lubricants, pigments, blowing agents, antitermites, and antifungal agents. These additives may be added singly to the curable composition or two or more thereof may be added in combination to the curable composition. Specific examples of these additives are disclosed in publications such as Japanese Kokoku Publications H4-69659 and H7-108928, and Japanese Kokai Publications S63-254149, 564-22904, 2001-72854, and 2008-303650.

The curable composition of the invention may be prepared as a one-pack type, which is to be cured by the moisture in the air after application, by compounding all components and tightly sealing the mixture in a container for storage, or as a two-pack type by separately preparing a curing agent by compounding a curing catalyst, a filler, a plasticizer, water and the like, so that such mixture and the main components of the curable composition may be mixed together prior to use. The one-pack type is desirable in terms of its workability.

In cases where the curable composition is of the one-pack type, the composition contains all components as mixed up in advance. Therefore, those components which contain moisture are desirably dehydrated and dried prior to addition or dehydrated during compounding and kneading by reducing the pressure, for instance. When the curable composition is of the two-pack type, it is not necessary to incorporate the curing catalyst in the main components containing a reactive silyl group-containing organic polymer. Therefore, even if the components contain some moisture, the risk of gelation of the components is low. In cases where long-term storage stability is required, however, it is desirable that the components be dehydrated or dried. With respect to the method of dehydrating or drying, the method comprising drying by heating is desirable in cases where the components are in the solid state such as powders; and, in cases where they are in the liquid state, the vacuum dehydration method and the dehydration method using a synthetic zeolite, activated alumina, silica gel, quick lime, magnesium oxide or the like are desirable. Alternatively, there may be employed the dehydration method in which a small amount of the isocyanate compound may be added to react an isocyanato group and water. Or alternatively, there may be employed the dehydration method in which oxazolidine compounds such as 3-ethyl-2-methyl-2-(3-methylbutyl) 3-oxazolidine, may be added and reacted with water. In addition to the dehydration and drying methods, there may be mentioned methods to add: lower alcohols such as methanol and ethanol; and alkoxysilane compounds such as n-propyltrimethoxysilane, vinyltrimethoxysilane, vinylmethyldimethoxysilane, methylsilicate, ethylsilicate, γ-mercaptpropylmethyldimethoxysilane, γ-mercaptopropylmethyldiethoxysilane, and γ-glycidoxypropyltrimethoxysilane; and thereby, storage stability is further improved.

In the case of using a dehydrating agent, particularly a silicon compound reactable with water, the addition level thereof is desirably 0.1 to 20 parts by weight, and more desirably 0.5 to 10 parts by weight, per 100 parts by weight of the polyoxyalkylene polymer (A) having a reactive silicon group.

The method of preparing the curable composition of the present invention is not particularly restricted, but there may be employed, for example, such a method known in the art as a method comprising combining the components mentioned above and kneading the resulting mixture at ordinary temperature or under heating using a mixer, roller, kneader, or the like, or a method comprising dissolving the components using small portions of an appropriate solvent and then mixing them up.

When the curable composition of the present invention is exposed in the atmosphere, because of the effect of moisture, the curable composition three-dimensionally forms a network, and is thus cured into a rubbery cured product.

Since the polyoxyalkylene polymer—the component (A) of the present invention-having a reactive silicon group has a comparatively low viscosity, a nonaqueous and/or non-solvent coatable composition (or a high-solid composition having a small amount of a solvent) can be easily designed. Problematically, an aqueous emulsion composition needs a long period of time to form a membrane at a low temperature or a high humidity, and is difficult to apply in cold weather. For this reason, the curable composition of the present invention is desirably a nonaqueous curable composition. Further, the curable composition of the present invention is desirably a non-solvent (or high-solid) curable composition from the viewpoint of reduction in environmental impact.

For production of the nonaqueous curable composition of the present invention, the amount of water in the curable composition is desirably 10 parts by weight or less, more desirably 1 part by weight or less, and further desirably 0.1 parts by weight or less with respect to 100 parts by weight of the component (A). Most desirably, substantially no water is contained in the curable composition of the present invention. When the amount of water exceeds the range, storage stability tends to be reduced, and coating performances may be deteriorated.

For production of the non-solvent curable composition, the amount of a solvent in the curable composition is desirably 10 parts by weight or less, more desirably 5 parts by weight or less, further desirably 1 part by weight or less, and particularly desirably 0.1 parts by weight or less with respect to 100 parts by weight of the component (A). Most desirably, substantially no solvent is contained in the curable composition of the present invention. When the amount of the solvent exceeds the range, VOC at the time of membrane formation increases, resulting in a tendency toward larger environmental issues.

The curable composition of the present invention is desirably of a one-pack type in terms of easy processing and no reduction in coating performance resulting from poor mixing and a mixing ratio error.

It is to be noted that substrates upon application of the curable composition of the present invention is not particularly limited, and specific examples thereof include: inorganic substrates such as a concrete wall, a concrete board, a concrete block, a CMU (Concrete Masonry Unit), a mortar board, an ALC panel, a gypsum board (e.g. Dens Glass Gold produced by Georgia Pacific), a slate board; wood substrates such as a wood, a plywood, and an OSB (Oriented Strand Board); organic substrates such as an asphalt, a modified bitumen, waterproofing sheets such as an EPDM and a TPO, and a urethane foam heat insulating material; and metal substrates such as a metal panel.

The thickness of a membrane obtained by curing the curable composition of the present invention is desirably 0.005 to 0.05 inch, more desirably 0.01 to 0.04 inch, further desirably 0.015 to 0.035 inch, and particularly desirably 0.02 to 0.03 inch. When the thickness of the membrane is less than the range, coating performances such as long-term durability, waterproofing property, and tear resistance of the membrane tend to be deteriorated. When the thickness of the membrane exceeds the range, moisture permeability tends to decrease, likely leading to high costs.

The method for applying the curable composition of the present invention is not particularly limited, and conventionally known application methods with use of a brush, a spatula, a squeegee, a roller, an air spray, an airless spray, etc. may be used as disclosed in Japanese Kokai Publication H10-298488.

The moisture permeability of the membrane obtained by curing the curable composition of the present invention can be evaluated by the following method. The curable composition of the present invention is molded into a sheet shape having a uniform thickness, cured at 23° C. at a relative humidity of 50% for 4 days, and further cured at 50° C. for 3 days. After measurement of the thickness of the obtained sheet-shaped cured product with a micrometer, the moisture vapor transmission is measured according to the wet cup method of ASTM E96 (also referred to as Water Method) at 23° C. with a relative humidity of 50%. Here, the moisture vapor transmission depends on the characteristics of the material used and the thickness of the evaluated sheet. Further, it is difficult to mold the curable composition into a sheet having totally the same thickness. Therefore, the value of [α×β/1000] (unit: Perm·inch) calculated by the moisture vapor transmission of the sheet-shaped cured product [β] (unit: Perm) and the thickness of the sheet-shaped cured product [α] (unit: mil) is defined as the value of moisture permeability in the present invention. The value exhibits the moisture permeability of the used material and hardly depends on the thickness of a sheet.

The moisture permeability of the membrane obtained by curing the curable composition of the present invention is desirably 0.4 perm·inch or more, more desirably 0.6 perm·inch or more, further desirably 0.8 perm·inch or more, particularly desirably 0.85 perm·inch or more, and further desirably 0.9 perm·inch or more. When the moisture permeability of the membrane is less than the range, the water vapor permeation from the applied substrate is not sufficient. As a result, there may occur problems such as dew condensation and mold or mildew around a substrate.

It is to be noted that the moisture vapor transmission of the membrane obtained by curing the curable composition of the present invention is desirably 17 perm or more, more desirably 20 perm or more, further desirably 25 perm or more, and particularly desirably 30 perm or more. When the moisture vapor transmission of the membrane is less than the range, water vapor permeation from the applied substrate is not sufficient. As a result, there may occur problems such as dew condensation and mold or mildew around a substrate.

<Application>

Since the polyoxyalkylene polymer—the component (A)—having a reactive silicon group has a comparatively low viscosity, the curable composition of the present invention can be easily designed to have a manageable viscosity. Further, the cured product obtained by curing the curable composition of the present invention has high moisture permeability, and has sufficient waterproofing property for preventing external water from infiltrating through the curable composition. Therefore, the curable composition of the present invention is useful as a waterproofing material intended to be applied to a building, and especially useful as a liquid-applied moisture-permeable waterproofing material. The liquid-applied moisture-permeable waterproofing material is a waterproofing material that is in a liquid state before curing, and is applied to a substrate with a brush, a spatula, a squeegee, a roller, etc., or processed with a spraying machine for membrane formation and curing to form a seamless waterproofing layer. Since the liquid-applied moisture-permeable waterproofing material has high moisture permeability, moisture from the substrate can be expelled outside. The liquid-applied waterproofing material has the following properties: (1) it forms a seamless membrane, and therefore has high performance due to absence of seams; (2) it is applicable to complex shapes; and other properties.

The conventional moisture-permeable waterproofing sheet is formed on a substrate of an exterior wall by taking advantage of its high moisture permeability and waterproofing property. Thereby, the sheet is used as a waterproofing material that prevents dew condensation of an exterior wall material by expelling water vapor from the exterior wall material to the outside while preventing external bulk moisture such as rainwater from infiltrating through the sheet. Thus, the conventional moisture-permeable waterproofing sheet is widely used for various business complexes, collective housings, single houses, etc., and especially widely used for buildings employing an external wall ventilation construction. However, since overlapped portions of two moisture-permeable waterproofing sheets are fixed with nails and pressure sensitive adhesive tapes, moisture may permeate from nail holes or gaps of pressure sensitive adhesive tapes in a long period of time and may damage various construction substrates such as steel frames and wood materials. In addition, moisture in the external air which enters through gaps between overlapped portions of two moisture-permeable waterproofing sheets or moisture generated by dew condensation may substantially damage various construction substrates. Additionally, when the external air enters through gaps, the temperature inside a building is more likely to change, and the efficiency of temperature control is reduced, resulting in energy loss. Since the curable composition of the present invention can be applied in a liquid state, a seamless membrane can be easily formed and external water and air can be sufficiently prevented from infiltrating through the seamless membrane. Therefore, it is especially useful as a liquid-applied moisture-permeable waterproofing material intended to be applied to a substrate of an exterior wall of a building.

It is to be noted that the substrate of an external wall to which the curable composition of the present invention is applied is not particularly limited, and desirable examples thereof include: inorganic substrates such as a concrete wall, a concrete board, a concrete block, a CMU (Concrete Masonry Unit), a mortar board, an ALC panel, a gypsum board (e.g. Dens Glass Gold produced by Georgia Pacific), and a slate board; wood substrates such as a wood, a plywood, and an OSB (Oriented Strand Board); and organic substrates such as a urethane foam heat insulating material.

The method for applying the curable composition of the present invention to the substrate of an exterior wall is not particularly limited, and examples thereof include an application with a brush, a spatula, a squeegee, a roller, an air spray, and an airless spray. The application with a roller, an air spray, or an airless spray is desirable especially for application to a large area because of its workability.

After the curable composition of the present invention has been applied to the substrate of an exterior wall and cured, the thickness of a membrane is desirably 0.005 to 0.05 inch, more desirably 0.01 to 0.04 inch, further desirably 0.015 to 0.035 inch, and particularly desirably 0.02 to 0.03 inch. When the thickness of the membrane is less than the range, coating performances such as long-term durability, waterproofing property, and tear resistance of the membrane tend to be deteriorated. When the thickness of the membrane exceeds the range, the moisture permeability tends to decrease, likely leading to high costs.

After the curable composition of the present invention has been applied to a substrate of an external wall and cured, various exterior cladding materials are constructed. The exterior cladding is not particularly limited. In the case of the internal insulation construction, for example, desirable is the method for finishing by constructing stuccos, paints, bricks, tiles, stones, siding boards, metal panels, etc. after the curable composition of the present invention has been applied to a substrate of an exterior wall and cured. In the case of the external insulation construction, desirable is the method for finishing by constructing stuccos, paints, bricks, tiles, stones, siding boards, metal panels, etc. after the curable composition of the present invention has been applied to a substrate of an exterior wall and cured and then an insulation board is laid thereon.

Waterproofing around an opening (the bottom of the sash, the opening of the window frame, etc.) such as a window and a door of a building is very difficult because of its complex shape, and most of the complaints about water leakage results from the leakage around the opening. In order to prevent such water leakage, a waterproofing tape with a pressure sensitive adhesive layer is used in gaps between moisture-permeable waterproofing sheets, overlapped portions thereof, end portions thereof, and the like. However, since the pressure sensitive adhesive layer of the waterproofing tape comprises a rubber or asphalt pressure sensitive adhesive layer, the moisture permeability of the site substantially decreases, and dew condensation may cause corrosion of the surrounding material such as a window and a door. In addition, the dew condensation induces mold or mildew growth, and thereby causes the air quality issues inside the building, leading to health impairment of residents and those working in the building, etc. Since the curable composition of the present invention can be applied in a liquid state, it is easily applicable to complex shapes. Moreover, since the membrane after cured exhibits sufficient waterproofing property and moisture permeability, it is especially useful as a liquid-applied moisture-permeable waterproofing material intended to be applied around openings of a building. The curable composition of the present invention can be also used for the opening of a duct, a wall handrail, a handrail corner, etc.

When the curable composition of the present invention is applied around openings of a building, the substrate is not particularly limited, and desirable examples thereof include: wood substrates such as a wood, a plywood, and an OSB (Oriented Strand Board); and inorganic substrates such as a concrete board, a concrete block, a CMU (Concrete Masonry Unit), a mortar board, an ALC panel, a gypsum board (e.g. Dens Glass Gold produced by Georgia Pacific), and a slate board.

The method for applying the curable composition of the present invention around openings of a building is not particularly limited, and examples thereof include an application with a brush, a spatula, a squeegee, a roller, an air spray, an airless spray, or the like. The application with a brush, a squeegee or a roller is desirable because it is less likely to produce an uneven coating.

After the curable composition of the present invention has been applied around openings of a building and cured, the thickness of a membrane is desirably 0.005 to 0.05 inch, more desirably 0.01 to 0.04 inch, further desirably 0.015 to 0.035 inch, and particularly desirably 0.02 to 0.03 inch. When the thickness of the membrane is less than the range, coating performances such as long-term durability, waterproofing property, and tear resistance of the membrane tend to be deteriorated. When the thickness of the membrane exceeds the range, moisture permeability tends to decrease, likely leading to high costs.

After the curable composition of the present invention has been applied around openings of a building and cured, various windows, doors, ducts, etc. are incorporated into the openings.

Since the curable composition of the present invention forms a seamless membrane, waterproofing reliability thereof is great. Therefore, the curable composition is especially useful as a liquid-applied moisture-permeable waterproofing material intended to be applied to a roof requiring high waterproofing performance. The liquid-applied moisture-permeable waterproofing material intended to be applied to a roof of a building is applied to a substrate for a roof such as a roofing board.

The curable composition of the present invention is not particularly limited, and examples of other applications include a sealing material for construction or industry such as an elastic sealing material for construction, a sealing material for siding boards, a sealing material for multiple glass, and a sealing material for automobiles, an electric and electronic component material such as a sealing material for back side of solar cells, an electrical insulating material such as an insulating coating material for electric wires and cables, a pressure sensitive adhesive, an adhesive, an elastic adhesive, a contact adhesive, a tile adhesive, a reactive hot-melt adhesive, a paint, a powder coating, a coating material, a foam, a sealing material for a can lid, a heat radiation sheet, an electrical and electronic potting material, a film, a gasket, a marine deck caulking, a casting material, various molding materials, an artificial marble, an antirust and waterproofing sealing material of an end face (cut section) of a wired glass and laminated glass, vibration-proof, vibration damping, sound-proof, and quake-absorbing materials used for automobiles, vessels, household appliances, etc., and liquid sealing materials and waterproofing materials, etc. used for automobile parts, electric parts, various machine parts, etc.

EXAMPLES

The following examples and comparative examples illustrate the present invention more specifically. These are, however, by no means limitative of the scope of the present invention.

Synthesis Example 1

Propylene oxide was polymerized using, as an initiator, a 1/1 (in weight ratio) mixture of polyoxypropylene diol with a molecular weight of about 2,000 and polyoxypropylene triol with a molecular weight of about 3,000 in the presence of a zinc hexacyanocobaltate glyme complex catalyst to give polypropylene oxide having a number average molecular weight of about 19,000 (polystyrene-equivalent molecular weight measured by using a TOSOH model HLC-8120 GPC solvent delivery system, a TOSOH model TSK-GEL H type column, with THF as a solvent). Thereto was then added a methanol solution of NaOMe in an amount of 1.2 equivalents relative to the hydroxy groups of the hydroxy-terminated polypropylene oxide, the methanol was distilled off. Further, allyl chloride was added to the residue for conversion of each terminal hydroxy group to an allyl group. The unreacted allyl chloride was removed by volatilization under reduced pressure. To 100 parts by weight of the crude allyl-terminated polypropylene oxide obtained were added 300 parts by weight of n-hexane and 300 parts by weight of water. After mixing with stirring, the water was removed by centrifugation. The hexane solution obtained was further mixed with 300 parts by weight of water with stirring, and after the water was removed again by centrifugation, the hexane was removed by volatilization under reduced pressure. In the above manner, allyl-terminated polypropylene oxide with a number average molecular weight of about 19,000 was obtained.

The allyl-terminated polypropylene oxide obtained (100 parts by weight) was reacted with 1.35 parts by weight of methyldimethoxysilane at 90° C. for 5 hours in the presence of 150 ppm of an isopropanol solution of platinum-vinylsiloxane complex (platinum content: 3% by weight) as a catalyst to give a methyldimethoxysilyl-terminated polypropylene oxide (A-1). As a result of $^1$H-NMR measurement of a introduction ratio of a silyl group (made in CDCl$_3$ solvent using a JEOL Ltd. model JNM-LA400), the average number of terminal methyldimethoxysilyl groups per molecule was found to be 1.7.

Synthesis Example 2

Propylene oxide was polymerized using, as an initiator, polyoxypropylene diol with a molecular weight of about 2,000 and a zinc hexacyanocobaltate glyme complex catalyst to give hydroxy-terminated bifunctional polypropylene oxide (hereinafter, also referred to as a polymer Q) having a number average molecular weight of about 25,500.

To 100 parts by weight of the polymer Q was added 1.8 parts by weight of γ-isocyanatopropyltrimethoxysilane, and the reaction was allowed to proceed at 90° C. for 5 hours to give a trimethoxysilyl-terminated polyoxypropylene polymer (A-2). As a result of $^1$H-NMR measurement of a silyl group introduction rate, the average number of terminal trimethoxysilyl groups per molecule was found to be about 1.4.

Synthesis Example 3

100 g (20 mmol) of polyoxypropylene diol whose hydroxy equivalent weight was 0.36 mmol/g and whose molecular weight was measured to be about 5,000 based on terminal analysis was mixed with 5.6 g (22.5 mmol) of MDI (4,4'-diphenylmethane diisocyanate, produced by Wako Pure Chemical Industries, Ltd.) having an NCO/OH ratio of 1.25 under nitrogen atmosphere, and stirred at 90° C. for 3 hours to give an NCO-terminated polyoxypropylene. Thereafter, 1.6 g (9 mmol) of γ-aminopropyltrimethoxysilane (produced by Momentive Performance Materials Inc.) was added to the obtained mixture. Then, the mixture was stirred at 40° C. for 1 hour to give trimethoxysilyl-terminated polyoxypropylene (A-3).

Synthesis Example 4

Propylene oxide was polymerized using, as an initiator, polyoxypropylene diol with a molecular weight of about 2,000 and a zinc hexacyanocobaltate glyme complex catalyst to give hydroxy-terminated polypropylene oxide having a number average molecular weight of about 14,500. Using this hydroxy-terminated polypropylene oxide, allyl-terminated polypropylene oxide was obtained in the same manner as in Synthesis Example 1.

This allyl-terminated polypropylene oxide was reacted with 1.8 parts by weight of methyldimethoxysilane in the same manner as in Synthesis Example 1 to give a polyoxypropylene polymer (A-4) having an average of 1.5 terminal methyldimethoxysilyl groups.

Examples 1 to 48 and Comparative Examples 1-7

Table 1 shows the monomer composition, the structure of the molecular chain end, the molecular weight, etc. of the used polyoxyalkylene plasticizer (B).

<Light stabilizer> Tinuvin 770 (produced by Ciba Specialty Chemicals)
<Amine compound> Armeen 12D (laurylamine, produced by Akzo Nobel)
<Dehydrating agent> A-171 (vinyltrimethoxysilane, produced by Momentive Performance Materials Inc.)
<Amino group-containing silane coupling agent> A-1120 (N-(3-aminoethyl)-γ-aminopropyl trimethoxysilane, produced by Momentive Performance Materials Inc.)
<Curing catalyst> Neostan U-220H (dibutyltin bis(acetylacetonate), produced by Nitto Kasei Co., Ltd.)

(Migration of Plasticizer to Membrane Surface after Curing)

The compositions of Tables 2A to 5 were each applied onto a Teflon film, adjusted with a spacer and a flat spatula to have a thickness of about 30 mil. Thereafter, the compositions were cured in a constant temperature and humidity room (23° C./50% RH) for 4 days and then in an 50° C. oven for 3 days

TABLE 1

| | Supplier | Monomer composition of main chain (wt %) | Molecular chain end | Molecular weight |
|---|---|---|---|---|
| ARCOL PPG-3025 | Bayer Material Science | Propylene oxide (100%) | Diol | 3000 |
| Poly-G 20-56 | Arch Chemicals | Propylene oxide (100%) | Diol | 2000 |
| Poly-G 20-112 | Arch Chemicals | Propylene oxide (100%) | Diol | 1000 |
| Poly-G 20-150 | Arch Chemicals | Propylene oxide (100%) | Diol | 750 |
| UCON LB-65 | Dow Chemical Company | Propylene oxide (100%) | Monoether monool | 340 |
| UCON LB-285 | Dow Chemical Company | Propylene oxide (100%) | Monoether monool | 1020 |
| UCON 50-HB-55 | Dow Chemical Company | Propylene oxide (50%) ethylene oxide (50%) | Monoether monool | 270 |
| UCON 50-HB-260 | Dow Chemical Company | Propylene oxide (50%) ethylene oxide (50%) | Monoether monool | 970 |
| UCON 50-HB-660 | Dow Chemical Company | Propylene oxide (50%) ethylene oxide (50%) | Monoether monool | 1590 |
| Poly-G 55-37 | Arch Chemicals | Propylene oxide (70%) ethylene oxide (30%) | Diol | 3000 |
| Poly-G 55-30 | Arch Chemicals | Propylene oxide (90 to 85%) ethylene oxide (10 to 15%) | Diol | 3700 |
| Jeffamine D-2000 | Huntsman Coporation | Propylene oxide (100%) | Both molecular chain ends—NH$_2$ | 2000 |
| Jeffamine M-600 | Huntsman Coporation | Propylene oxide (92%) ethylene oxide (8%) | One molecular chain end—ether, the other molecular chain end—NH$_2$ | 600 |
| Jeffamine D-400 | Huntsman Coporation | Propylene oxide (100%) | Both molecular chain ends—NH$_2$ | 430 |
| Poly-G 83-34 | Arch Chemicals | Propylene oxide (30%) ethylene oxide (70%) | Triol | 5000 |
| Poly-G 21-187 | Arch Chemicals | Ethylene oxide (100%) | Diol | 600 |
| Jeffamine D-230 | Huntsman Coporation | Propylene oxide (100%) | Both molecular chain ends—NH$_2$ | 230 |
| Jeffamine ED-600 | Huntsman Coporation | Propylene oxide (35%) ethylene oxide (65%) | Both molecular chain ends—NH$_2$ | 600 |

According to the formulations shown in Tables 2A to 5, a component (A), a plasticizer, a filler, a thixotropic agent, various stabilizers, an amine compound, a dehydrating agent, an adhesion promoter, a curing catalyst, etc. were measured, kneaded with a mixer with substantially no water existing under dehydrating condition. Thereafter, they were sealed in a moisture-proof container (polyethylene cartridge) to give a one-pack type curable composition. Each one-pack type composition of Tables 2A to 5 was extruded from each cartridge upon use, and the following evaluations were made.

The compounding agents other than the component (A) and the component (B) are shown below.
<Phthalate ester plasticizer> Jayflex DIDP (di-isodecyl phthalate, produced by Exon Chemical Company)
<Colloidal calcium carbonate> Ultra-Pflex (produced by Specialty Minerals Inc.)
<Surface-treated ground calcium carbonate> Hubercarb G2T (produced by Huber Engineered Materials)
<Titanium oxide> Ti-Pure R902+ (produced by DuPont)
<Thixotropic agent> Crayvallac SL (amide-wax-based thixotropic agent, produced by Cray Valley)
<Ultraviolet absorber> Tinuvin 328 (produced by Ciba Specialty Chemicals)

to give a membrane cured product. The cured product was left standing in a constant temperature and humidity room, and the migration of the plasticizer to the membrane surface was evaluated by viewing and by touching with a finger. In the evaluation, A represents the case where no migration of the plasticizer was observed, B represents the case where the slight migration of the plasticizer was observed, C represents the case where the obvious migration of the plasticizer was clearly observed, and D represents the case where the remarkable migration of the plasticizer was observed. Tables 2A to 5 show the results.

(Curability of Curable Composition)

The curable compositions of Tables 2A to 5 were each filled into a mold with a thickness of about 3 mm using a spatula, and then the surface of the composition was leveled to be flat. This moment was defined as the curing starting time. The surface was touched with the spatula and the time period when the mixture was not stuck to the spatula any more was determined as the skinning time. The skinning time was determined under the condition at 23° C. and 50% RH. The shorter the skinning time is, the better the curability is. The one-pack cartridge was stored at 50° C. for 28 days, and the skinning time was evaluated before the storage (T1) and after the storage (T2). Tables 2A to 5 show the results.
(Viscosity of Curable Composition)

Before measurement of viscosity, the one-pack type cartridge was first left at rest in a constant temperature and humidity room (23° C./50% RH) overnight. The next day, each of the compositions of Tables 2A to 5 was charged into a polystyrene cylindrical container having a diameter of 25 mm and a height of 85 mm from the one-pack type cartridge. By using a No. 7 spindle, the viscosity was measured at 2 rpm with a Brookfield viscometer (HADV-I+). The one-pack type cartridge was stored at 50° C. for 28 days, and viscosities were evaluated before the storage (η1) and after the storage (η2). Tables 2A to 5 show the results.
(Moisture Permeability of Cured Product)

The moisture permeability of the cured product was evaluated according to Water Method of ASTM E96 (wet cup method).

The compositions of Tables 2A to 5 were each applied onto a Teflon film, adjusted with a spacer and a flat spatula to have a thickness of about 30 mil, and thereafter, cured in a constant temperature and humidity room (23° C./50% RH) for 4 days and then in a 50° C. oven for 3 days. The cured product sheet was cut in a cup size after curing, and the thickness (α) thereof was measured. About 15 g of water was poured into a cup produced by Gardco for measuring moisture vapor transmission, and then, a cured product sheet, a clamping ring, and a cap were sequentially set. The weight thereof was measured, and the weight was measured in a constant temperature and humidity room (23° C./50% RH) for 4 days at an interval of 24 hours, and the moisture vapor transmission (β) was calculated. Tables 2A to 5 show the results.

It is to be noted that Example 1 is listed in Tables 2A, 3, and 4, Example 14 is listed in Tables 3 and 5, and Comparative Example 2 is listed in Tables 2B, 3, and 4; the duplicate description is for easier comparison with other data.

TABLE 2A

| Composition (parts by weight) | | | Examples | | | | | | | | | |
|---|---|---|---|---|---|---|---|---|---|---|---|---|
| | | | 1 | 2 | 3 | 4 | 5 | 6 | 7 | 8 | 9 | 10 |
| Polyoxyalkylene polymer: component (A) | | A-1 | 100 | 100 | 100 | 100 | 100 | 100 | 100 | 100 | 100 | |
| | | A-2 | | | | | | | | | | 100 |
| | | A-3 | | | | | | | | | | |
| | | A-4 | | | | | | | | | | |
| Polyoxyalkylene plasticizer | (b1) | ARCOL PPG-3025 | 65 | 65 | 65 | 65 | 65 | 65 | 65 | 65 | 20 | 65 |
| | | Poly-G 20-56 | | | | | | | | | | |
| | | Poly-G 20-112 | | | | | | | | | | |
| | | Poly-G 20-150 | | | | | | | | | | |
| | | Poly-G 55-37 | | | | | | | | | 45 | |
| | | Poly-G 83-34 | | | | | | | | | | |
| | | Poly-G 21-187 | | | | | | | | | | |
| Phthalate ester plasticizer | | Jayflex DIDP | | | | | | | | | | |
| Colloidal calcium carbonate | | Ultra Pflex | 100 | 50 | 100 | 100 | 100 | 50 | 20 | 20 | 100 | 20 |
| Surface-treated gound calcium carbonate | | Hubercarb G2T | | | | | | | | | | |
| Titanium oxide | | Ti-Pure R902+ | 20 | 20 | 20 | 20 | 20 | 20 | 20 | 20 | 20 | 20 |
| Thixotropic agent | | Crayvallac SL | 4 | 5 | 4 | 4 | 4 | 5 | 7 | 7 | 4 | 7 |
| Ultraviolet absorber | | Tinuvin 328 | 1 | 1 | 1 | 1 | 1 | 1 | 1 | 1 | 1 | 1 |
| Light stabilizer | | Tinuvin 770 | 1 | 1 | 1 | 1 | 1 | 1 | 1 | 1 | 1 | 1 |
| Amine compound: component (C) | | Laurylamine | | | 5 | | 5 | 5 | 5 | 5 | | 5 |
| Dehydrating agent | | A-171 | 3 | 3 | 3 | 3 | 3 | 3 | 3 | 1 | 3 | 3 |
| Amino group-containing silane coupling agent: component (D) | | A-1120 | 3 | 3 | 3 | 6 | 6 | 6 | 6 | 12 | 3 | 6 |
| Curing catalyst | | Neostan U-220H | 1 | 2 | 1 | 1 | 2 | 2 | 2 | 2 | 1 | 0.2 |
| Total | | | 298 | 250 | 303 | 301 | 307 | 258 | 230 | 234 | 298 | 228.2 |
| Ratio (W2/W1) of total weight (W2) of component (A) and component (B) with respect to total weight of curable composition (W1) | | | 55 wt % | 66 wt % | 54 wt % | 55 wt % | 54 wt % | 64 wt % | 72 wt % | 71 wt % | 55 wt % | 72 wt % |
| Migration of plasticizer to membrane surface after curing | | | A | A | A | A | A | A | A | A | B | A |
| Curability before storage | T1: skinning time (min) | | 103 | 36 | 66 | 57 | 22 | 23 | 24 | 17 | 78 | 15 |
| Curability after storage | T2: skinning time (min) | | 91 | 49 | 49 | 42 | 26 | 23 | 27 | 18 | 79 | 18 |
| Curing retardation rate | [T2/T1] | | 0.88 | 1.36 | 0.74 | 0.74 | 1.18 | 1.00 | 1.13 | 1.06 | 1.01 | 1.20 |
| Viscosity before storage (2 rpm) | η1(Pa·s) | | 872 | 478 | 1718 | 868 | 1546 | 406 | 258 | 262 | 910 | 349 |
| Viscosity after storage (2 rpm) | η2(Pa·s) | | 928 | 676 | 1828 | 856 | 1310 | 370 | 304 | 276 | 962 | 432 |
| Thickening ratio | [η2/η1] | | 1.06 | 1.41 | 1.06 | 0.99 | 0.85 | 0.91 | 1.18 | 1.05 | 1.06 | 1.24 |
| Thickness of membrane: α | (mil) | | 23.0 | 23.2 | 24.0 | 24.5 | 24.6 | 31.8 | 30.5 | 33.0 | 22.6 | 27.8 |

TABLE 2A-continued

| Composition (parts by weight) | | Examples | | | | | | | | | |
|---|---|---|---|---|---|---|---|---|---|---|---|
| | | 1 | 2 | 3 | 4 | 5 | 6 | 7 | 8 | 9 | 10 |
| Moisture vapor transmission (ASTM-96): β | (Perms) | 17.7 | 20.8 | 20.3 | 20.6 | 19.6 | 18.7 | 20.8 | 20.9 | 33.6 | 23.3 |
| [α × β/1000] | (Perm · inch) | 0.41 | 0.48 | 0.49 | 0.50 | 0.48 | 0.59 | 0.63 | 0.69 | 0.76 | 0.65 |

TABLE 2B

| Composition (parts by weight) | | | 11 | 12 | 13 | 14 | 15 | 16 | 17 | Comparative Examples | | | |
|---|---|---|---|---|---|---|---|---|---|---|---|---|---|
| | | | | | | | | | | 1 | 2 | 3 | 4 |
| Polyoxyalkylene polymer: component (A) | | A-1 | | 100 | 100 | 100 | 100 | | | 100 | 100 | 100 | 100 |
| | | A-2 | | | | | | | | | | | |
| | | A-3 | | | 100 | | | | | | | | |
| | | A-4 | | | | | | 100 | 100 | | | | |
| Polyoxyalkylene plasticizer | (b1) | ARCOL PPG-3025 | 65 | | | | | | | 65 | | 45 | 45 |
| | | Poly-G 20-56 | | 65 | | | | | | | | | |
| | | Poly-G 20-112 | | | 65 | | | | | | | | |
| | | Poly-G 20-150 | | | | 65 | 65 | 65 | 65 | | | | |
| | | Poly-G 55-37 | | | | | | | | | | | |
| | | Poly-G-83-34 | | | | | | | | | | 20 | |
| | | Poly-G 21-187 | | | | | | | | | | | 20 |
| Phthalate ester plasticizer | | Jayflex DIDP | | | | | | | | 65 | | | |
| Colloidal calcium carbonate | | Ultra Pflex | 20 | 100 | 100 | 100 | 80 | 60 | 30 | 100 | 50 | 100 | 100 |
| Surface-treated ground calcium carbonate | | Hubercarb G2T | | | | | | | 50 | | 160 | | |
| Titanium oxide | | Ti-Pure R902+ | 20 | 20 | 20 | 20 | 20 | 20 | 20 | 20 | 20 | 20 | 20 |
| Thixotropic agent | | Crayvallac SL | 7 | 4 | 4 | 4 | 7 | 4 | 1.5 | 4 | 3 | 4 | 4 |
| Ultraviolet absorber | | Tinuvin 328 | 1 | 1 | 1 | 1 | 1 | 1 | 1 | 1 | 1 | 1 | 1 |
| Light stabilizer | | Tinuvin 770 | 1 | 1 | 1 | 1 | 1 | 1 | 1 | 1 | 1 | 1 | 1 |
| Amine compound: component (C) | | Laurylamine | 5 | | | | | | | | | | |
| Dehydrating agent | | A-171 | 3 | 3 | 3 | 3 | 3 | 4 | 4 | 3 | 3 | 3 | 3 |
| Amino group-containing silane coupling agent: component (D) | | A-1120 | 6 | 3 | 3 | 3 | 9 | 9 | 9 | 3 | 3 | 3 | 3 |
| Curing catalyst | | Neostan U-220H | 0.2 | 1 | 1 | 1 | 1 | 0.8 | 0.8 | 1 | 1 | 1 | 1 |
| Total | | | 228.2 | 298 | 298 | 298 | 287 | 264.8 | 282.3 | 298 | 407 | 298 | 298 |
| Ratio (W2/W1) of total weight (W2) of component (A) and component (B) with respect to total weight of curable composition (W1) | | | 72 wt % | 55 wt % | 55 wt % | 55 wt % | 57 wt % | 62 wt % | 58 wt % | 34 wt % | 41 wt % | 49 wt % | 49 wt % |
| Migration of plasticizer to membrane surface after curing | | | A | A | A | A | A | A | A | A | A | C | C |
| Curability before storage | T1: skinning time (min) | | 12 | 86 | 84 | 84 | 60 | 92 | 83 | 66 | 105 | — | — |
| Curability after storage | T2: skinning time (min) | | 16 | 81 | 152 | 156 | 62 | 112 | 112 | 118 | 96 | — | — |
| Curing retardation rate | [T2/T1] | | 1.33 | 0.94 | 1.81 | 1.86 | 1.03 | 1.22 | 1.35 | 1.79 | 0.91 | — | — |
| Viscosity before storage (2 rpm) | η1(Pa · s) | | 533 | 930 | 944 | 976 | 948 | 334 | 92 | 794 | 902 | 848 | 1052 |
| Viscosity after storage (2 rpm) | η2(Pa · s) | | 713 | 1024 | 1096 | 1248 | 1140 | 472 | 130 | 716 | 1030 | — | — |
| Thickening ratio | [η2/η1] | | 1.34 | 1.10 | 1.16 | 1.28 | 1.20 | 1.41 | 1.41 | 0.90 | 1.14 | — | — |
| Thickness of membrane: α | (mil) | | 31.2 | 35.9 | 33.9 | 36.0 | 34.7 | 33.7 | 33.0 | 33.1 | 24.5 | 20.3 | 22.7 |
| Moisture vapor transmission (ASTM E-96): β | (Perms) | | 22.5 | 13.4 | 16.9 | 16.8 | 18.6 | 21.2 | 21.9 | 6.3 | 15.1 | 27.7 | 24.9 |
| [α × β/1000] | (Perm · inch) | | 0.70 | 0.48 | 0.57 | 0.60 | 0.65 | 0.71 | 0.72 | 0.21 | 0.37 | 0.56 | 0.57 |

As shown in Table 2A and 2B, the curable compositions (I) of Examples 1 to 17 that contain the component (b1) and having a W2/W1 ratio of 51 to 80 wt % each had a moisture permeability of 0.4 perm/inch or more, which was better than the moisture permeability of Comparative Example 1 with the use of a phthalate ester plasticizer and the moisture permeability of Comparative Example 2 with the use of a plasticizer (B1) containing the component (b1) and with a W2/W1 ratio of less than 51 wt %. The migration of the plasticizer to the membrane surface after curing was observed in Comparative Example 3 that contained Poly-G 83-34 with a molecular weight larger than 4500 and Comparative Example 4 that contained Poly-G 21-187 not containing an oxypropylene-derived repeating unit.

TABLE 3

| Composition (parts by weight) | | | | Examples |  |  |  |  |  |  |  |  |
|---|---|---|---|---|---|---|---|---|---|---|---|---|
| | | | | 1 | 18 | 19 | 20 | 21 | 22 | 23 | 24 | 25 |
| Polyoxyalkylene polymer: component (A) | | | A-1 | 100 | 100 | 100 | 100 | 100 | 100 | 100 | 100 | 100 |
| | | | A-2 | | | | | | | | | |
| | | | A-3 | | | | | | | | | |
| Polyoxyalkylene plasticizer | (b1) | (b7) | ARCOL PPG-3025 | 65 | | | | | | | | |
| | (b2) | (b6) | UCON LB-65 | | 65 | | 35 | 18 | 25 | 45 | 25 | 25 |
| | | | UCON LB-285 | | | 65 | | 7 | | | | |
| | | (b3) | UCON 50-MB-260 | | | | 30 | 40 | 40 | | 40 | 40 |
| | (b1) | | Poly-6 55-37 | | | | | | | 20 | | |
| Colloidal calcium carbonate | | | Ultra Pflex | 100 | 100 | 100 | 50 | 50 | 50 | 50 | 100 | 50 |
| Surface-treated ground calcium carbonate | | | Hubercarb 62T | | | | | | | | | 160 |
| Titanium oxide | | | Ti-Pure R902+ | 20 | 20 | 20 | 20 | 20 | 20 | 20 | 20 | 20 |
| Thixotropic agent | | | Crayvallac SL | 4 | 4 | 4 | 6 | 6 | 6 | 6 | 4 | 3 |
| Ultraviolet absorber | | | Tinuvin 328 | 1 | 1 | 1 | 1 | 1 | 1 | 1 | 1 | 1 |
| Light stabilizer | | | Tinuvin 710 | 1 | 1 | 1 | 1 | 1 | 1 | 1 | 1 | 1 |
| Amine compound: component (C) | | | Laurylamine | | | | 5 | 5 | 5 | 5 | 5 | 5 |
| Dehydrating agent | | | A-171 | 3 | 3 | 3 | 3 | 3 | 3 | 3 | 3 | 3 |
| Amino group-containing silane coupling agent: component (D) | | | A-1120 | 3 | 3 | 3 | 6 | 6 | 6 | 6 | 6 | 6 |
| Curing catalyst | | | Neostan U-220H | 1 | 1 | 1 | 1.5 | 1.5 | 1.5 | 1.5 | 1.5 | 1.5 |
| Total | | | | 298 | 298 | 298 | 258.5 | 258.5 | 258.5 | 258.5 | 306.5 | 415.5 |
| Ratio (W2/W1) of total weight (W2) of component (A) and component (B) with respect to total weight of curable composition (W1) | | | | 55 wt % | 55 wt % | 55 wt % | 64 wt % | 64 wt % | 64 wt % | 64 wt % | 54 wt % | 40 wt % |
| Migration of plasticizer to membrane surface after curing | | | | A | A | A | A | A | A | B | A | A |
| Curability before storage | | | T1: skinning time (min) | 103 | 74 | 75 | 50 | 43 | 38 | 54 | 40 | 37 |
| Curability after storage | | | T2: skinning time (min) | 91 | 298 | 89 | 62 | 45 | 51 | 15 | 47 | 50 |
| Curing retardation rate | | | [T2/T1] | 0.88 | 4.03 | 1.19 | 1.24 | 1.05 | 1.34 | 1.39 | 1.18 | 1.35 |
| Viscosity before storage (2 rpm) | | | η1(Pa·s) | 872 | 776 | 744 | 526 | 564 | 604 | 594 | 1738 | 916 |
| Viscosity after storage (2 rpm) | | | η2(Pa·s) | 928 | 768 | 766 | 402 | 608 | 736 | 462 | 1684 | 1024 |
| Thickening ratio | | | [η2/η1] | 1.06 | 0.99 | 1.03 | 0.76 | 1.08 | 1.22 | 0.78 | 0.97 | 1.12 |
| Thickness of membrane: α | | | (mil) | 23.0 | 20.4 60.5 | | 22.2 | 31.1 | 32.5 | 32.8 | 30.1 | 32.2 | 31.8 |
| Moisture vapor transmission (ASTM E-96): β | | | (Perms) | 17.7 | 32.0 11.0 | | 22.4 | 27.4 | 32.4 | 32.9 | 30.4 | 30.2 | 21.8 |
| [α × β/1000] | | | (Perm · inch) | 0.41 | 0.65 0.67 | | 0.50 | 0.85 | 1.05 | 1.08 | 0.92 | 0.97 | 0.69 |

| Composition (parts by weight) | | | | Examples |  |  |  |  |  |  |  | Comparative Example |
|---|---|---|---|---|---|---|---|---|---|---|---|---|
| | | | | 26 | 27 | 28 | 29 | 30 | 31 | 32 | 33 | 2 |
| Polyoxyalkylene polymer: component (A) | | | A-1 | 100 | 100 | 100 | 100 | | | | | 100 |
| | | | A-2 | | | | | 100 | 100 | | | |
| | | | A-3 | | | | | | | 100 | 100 | |
| Polyoxyalkylene plasticizer | (b1) | (b7) | ARCOL PPG-3025 | | | | | | | | | 65 |
| | (b2) | (b6) | UCON LB-65 | 15 | 25 | 15 | 15 | 45 | 25 | 45 | 25 | |
| | | | UCON LB-285 | | | | | | | | | |
| | | (b3) | UCON 50-MB-260 | 50 | 40 | 50 | 50 | | 40 | | 40 | |
| | (b1) | | Poly-6 55-37 | | | | | 20 | | 20 | | |
| Colloidal calcium carbonate | | | Ultra Pflex | 50 | 50 | 50 | 50 | 50 | 50 | 50 | 50 | 50 |
| Surface-treated ground calcium carbonate | | | Hubercarb 62T | 160 | 80 | 80 | 80 | | 80 | | 80 | 160 |
| Titanium oxide | | | Ti-Pure R902+ | 20 | 20 | 20 | 20 | 20 | 20 | 20 | 20 | 20 |

TABLE 3-continued

| | | | | | | | | | | |
|---|---|---|---|---|---|---|---|---|---|---|
| Thixotropic agent | Crayvallac SL | 3 | 3 | 3 | 3 | 6 | 3 | 6 | 3 | 3 |
| Ultraviolet absorber | Tinuvin 328 | 1 | 1 | 1 | 1 | 1 | 1 | 1 | 1 | 1 |
| Light stabilizer | Tinuvin 710 | 1 | 1 | 1 | 1 | 1 | 1 | 1 | 1 | 1 |
| Amine compound: component (C) | Laurylamine | 5 | 5 | 5 | | 5 | 5 | 5 | 5 | |
| Dehydrating agent | A-171 | 3 | 3 | 3 | 3 | 3 | 3 | 3 | 3 | 3 |
| Amino group-containing silane coupling agent: component (D) | A-1120 | 6 | 6 | 3 | 3 | 6 | 6 | 6 | 6 | 3 |
| Curing catalyst | Neostan U-220H | 1.5 | 1.5 | 1.5 | 1.5 | 0.15 | 0.15 | 0.15 | 0.15 | 1 |
| Total | | 415.5 | 335.5 | 332.5 | 327.5 | 257.15 | 334.15 | 257.15 | 334.15 | 407 |
| Ratio (W2/W1) of total weight (W2) of component (A) and component (B) with respect to total weight of curable composition (W1) | | 40 wt % | 49 wt % | 50 wt % | 50 wt % | 64 wt % | 49 wt % | 64 wt % | 49 wt % | 41 wt % |
| Migration of plasticizer to membrane surface after curing | | A | A | A | A | B | A | B | A | A |
| Curability before storage | T1: skinning time (min) | 40 | 37 | 45 | 68 | 35 | 25 | 21 | 20 | 105 |
| Curability after storage | T2: skinning time (min) | 53 | 59 | 75 | 142 | 48 | 37 | 38 | 31 | 96 |
| Curing retardation rate | [T2/T1] | 1.33 | 1.59 | 1.67 | 2.15 | 1.37 | 1.48 | 1.41 | 1.55 | 0.91 |
| Viscosity before storage (2 rpm) | $\eta 1$(Pa·s) | 944 | 148 | 824 | 408 | 713 | 952 | 879 | 1150 | 902 |
| Viscosity after storage (2 rpm) | $\eta 2$(Pa·s) | 1072 | 912 | 976 | 608 | 689 | 1250 | 918 | 1550 | 1030 |
| Thickening ratio | [$\eta 2/\eta 1$] | 1.14 | 1.22 | 1.18 | 1.49 | 0.91 | 1.31 | 1.04 | 1.35 | 1.14 |
| Thickness of membrane: $\alpha$ | mil) | 33.2 | 32.6 | 30.8 | 31.2 | 28.2 | 28.5 | 30.7 | 30.6 | 24.5 |
| Moisture vapor transmission (ASTM E-96): $\beta$ | (Perms) | 21.9 | 26.1 | 27.8 | 28.9 | 32.2 | 29.5 | 31.8 | 29.2 | 15.1 |
| [$\alpha \times \beta /1000$] | (Perm·inch) | 0.73 | 0.85 | 0.86 | 0.90 | 0.91 | 0.84 | 0.98 | 0.89 | 0.37 |

As shown in Table 3, the curable compositions (II) of Examples 18 to 33 that contained the component (b2) had a moisture permeability better than that of Example 1 and Comparative Example 2 that did not contain the component (b2). The curable compositions (II) of Examples 20 to 33 that contained both the component (b6) and the component (b3) had a further better moisture permeability. Especially in the case of using the component (b3) that contained both an —OH group and a group represented by —OR$^9$, no migration of the plasticizer to the membrane surface after curing was observed, and thus it was favorable.

TABLE 4

| Composition (parts by weight) | | | Examples | | | | | | | | Comparative Example |
|---|---|---|---|---|---|---|---|---|---|---|---|
| | | | 1 | 34 | 35 | 36 | 37 | 38 | 39 | 40 | 2 |
| Polyoxyalkylene polymer: component (A) | | A-1 | 100 | 100 | 100 | 100 | 100 | 100 | 100 | 100 | 100 |
| Polyoxyalkylene plasticizer | (b7) | ARCOL PPG-3025 | 65 | 35 | 25 | 35 | 25 | | | | 65 |
| | (b6) | UCON LB-65 | | | | | | | 15 | 15 | |
| | (b3) | UCON 50-HB-55 | | 30 | 40 | | | | | | |
| | | UCON 50-HB-260 | | | | 30 | 40 | 65 | 20 | | |
| | | Poly-G 55-30 | | | | | | | 30 | 50 | |
| Colloidal calcium carbonate | | Ultra Pflex | 100 | 100 | 100 | 100 | 100 | 50 | 50 | 50 | 50 |
| Surface-treated ground calcium carbonate | | Hubercarb G2T | | | | | | 160 | 160 | 160 | 160 |
| Titanium oxide | | Ti-Pure R902+ | 20 | 20 | 20 | 20 | 20 | 20 | 20 | 20 | 20 |
| Thixotropic agent | | Crayvallac SL | 4 | 4 | 4 | 4 | 4 | 3 | 3 | 3 | 3 |
| Ultraviolet absorber | | Tinuvin 328 | 1 | 1 | 1 | 1 | 1 | 1 | 1 | 1 | 1 |
| Light stabilizer | | Tinuvin 770 | 1 | 1 | 1 | 1 | 1 | 1 | 1 | 1 | 1 |
| Amine compound: component (C) | | Laurylamine | | | | | | 5 | 5 | 5 | |
| Dehydrating agent | | A-171 | 3 | 3 | 3 | 3 | 3 | 3 | 3 | 3 | 3 |
| Amino group-containing silane coupling agent: component (D) | | A-1120 | 3 | 3 | 3 | 3 | 3 | 6 | 6 | 6 | 3 |
| Curing catalyst | | Neostan U-220H | 1 | 1 | 1 | 1 | 1 | 1.5 | 1.5 | 1.5 | 1 |
| Total | | | 298 | 298 | 298 | 298 | 298 | 415.5 | 415.5 | 415.5 | 407 |

TABLE 4-continued

|  | Composition (parts by weight) | 1 | 34 | 35 | 36 | Examples 37 | 38 | 39 | 40 | Comparative Example 2 |
|---|---|---|---|---|---|---|---|---|---|---|
| Ratio (W2/W1) of total weight (W2) of component (A) and component (B) with respect to total weight of curable composition (W1) | | 55 wt % | 55 wt % | 55 wt % | 55 wt % | 55 wt % | 40 wt % | 40 wt % | 40 wt % | 41 wt % |
| Migration of plasticizer to membrane surface after curing | | A | A | A | A | A | B | A | A | A |
| Curability before storage | T1: skinning time (min) | 103 | 81 | 83 | 86 | 76 | 37 | 34 | 31 | 105 |
| Curability after storage | T2: skinning time (min) | 91 | 147 | 155 | 98 | 98 | — | 47 | 28 | 96 |
| Curing retardation rate | [T2/T1] | 0.88 | 1.81 | 1.87 | 1.14 | 1.29 | — | 1.38 | 0.90 | 0.91 |
| Viscosity before storage (2 rpm) | η1(Pa · s) | 872 | 672 | 794 | 690 | 768 | 980 | 954 | 956 | 902 |
| Viscosity after storage (2 rpm) | η2(Pa · s) | 928 | 678 | 786 | 774 | 826 | — | 1096 | 1120 | 1030 |
| Thickening ratio | [η2/η1] | 1.06 | 1.01 | 0.99 | 1.12 | 1.08 | — | 1.15 | 1.17 | 1.14 |
| Thickness of membrane: α | (mil) | 23.0 | 21.6 | 34.2 | 22.4 | 34.1 | 33.7 | 30.7 | 31.4 | 24.5 |
| Moisture vapor transmission (ASTM E-96): β | (Perms) | 17.7 | 24.9 | 16.7 | 25.9 | 18.6 | 20.2 | 25.2 | 18.2 | 15.1 |
| [α × β/1000] | (Perm · inch) | 0.41 | 0.54 | 0.57 | 0.58 | 0.63 | 0.68 | 0.77 | 0.57 | 0.37 |

As shown in Table 4, the curable compositions (III) of Examples 34 to 40 that contained the component (b3) had a moisture permeability better than that of Example 1 and Comparative Example 2 that did not contain the component (b3). The slight migration of the plasticizer to the membrane surface after curing was slightly observed in Example 38 that contained only the component (b3) while no migration of the plasticizer to the membrane surface after curing was observed in Examples 34 to 37 that contain both the component (b3) and the component (b7), and thus it was favorable.

TABLE 5

|  | Composition (parts by weight) | | 20 | 41 | Examples 42 | 43 | 44 | 45 |
|---|---|---|---|---|---|---|---|---|
| Polyoxyalkylene polymer: component (A) | | A-1 | 100 | 100 | 100 | 100 | 100 | 100 |
| | | A-2 | | | | | | |
| | | A-3 | | | | | | |
| Polyoxyalkylene plasticizer | (b5) | ARCOL PPG-3025 | 35 | | | | | 15 |
| | | UCON LB-65 | | | | | | |
| | | UCON 50-HB-260 | 30 | 30 | | 40 | 50 | |
| | | UCON 50-HB-660 | | | 30 | | | |
| | (b4) | Jeffamine D-2000 | | 35 | 35 | 25 | 15 | |
| | | Jeffamine M-600 | | | | | | 50 |
| | | Jeffamine D-400 | | | | | | |
| | | Jeffamine D-230 | | | | | | |
| | | Jeffamine ED-600 | | | | | | |
| Colloidal calcium carbonate | | Ultra Pflex | 50 | 50 | 50 | 50 | 50 | 50 |
| Surface-treated ground calcium carbonate | | Hubercarb G2T | | | | 160 | 160 | 160 |
| Titanium oxide | | Ti-Pure R902+ | 20 | 20 | 20 | 20 | 20 | 20 |
| Thixotropic agent | | Crayvallac SL | 6 | 6 | 6 | 3 | 3 | 3 |
| Ultraviolet absorber | | Tinuvin 328 | 1 | 1 | 1 | 1 | 1 | 1 |
| Light stabilizer | | Tinuvin 770 | 1 | 1 | 1 | 1 | 1 | 1 |
| Amine compound: component (C) | | Laurylamine | 5 | 5 | 5 | 5 | 5 | 5 |
| Dehydrating agent | | A-171 | 3 | 3 | 3 | 3 | 3 | 3 |
| Amino group-containing silane coupling agent: component (D) | | A-1120 | 6 | 6 | 6 | 6 | 6 | 6 |
| Curing catalyst | | Neostan U-220H | 1.5 | 1.5 | 1.5 | 1.5 | 1.5 | 1.5 |
| | | Total | 258.5 | 258.5 | 258.5 | 415.5 | 415.5 | 415.5 |
| Ratio (W2/W1) of total weight (W2) of component (A) and component (B) with respect to total weight of curable composition (W1) | | | 64 wt % | 64 wt % | 64 wt % | 40 wt % | 40 wt % | 40 wt % |
| Migration of plasticizer to membrane surface after curing | | | A | A | B | A | A | A |
| Curability before storage | T1: skinning time (min) | | 50 | 39 | 40 | 41 | 38 | 53 |
| Curability after storage | T2: skinning time (min) | | 62 | 40 | — | 37 | 33 | 59 |

TABLE 5-continued

| | | | | | | | |
|---|---|---|---|---|---|---|---|
| Curing retardation rate | [T2/T1] | 1.24 | 1.03 | — | 0.90 | 0.87 | 1.11 |
| Viscosity before storage (2 rpm) | η1(Pa·s) | 526 | 714 | 708 | 926 | 996 | 832 |
| Viscosity after storage (2 rpm) | η2(Pa·s) | 402 | 616 | — | 976 | 1064 | 806 |
| Thickening ratio | [η2/η1] | 0.76 | 0.86 | — | 1.05 | 1.07 | 0.97 |
| Thickness of membrane: α | (mil) | 31.1 | 30.7 | 33.1 | 32.7 | 33.1 | 32 |
| Moisture vapor transmission (ASTM E-96): β | (Perms) | 27.4 | 32.2 | 30.4 | 20.1 | 21.7 | 18.7 |
| [α × β/1000] | (Perm · inch) | 0.85 | 0.99 | 1.01 | 0.66 | 0.72 | 0.60 |

| | | | Examples | | | Comparative Examples | |
|---|---|---|---|---|---|---|---|
| Composition (parts by weight) | | | 46 | 47 | 48 | 5 | 6 | 7 |
| Polyoxyalkylene polymer: component (A) | | A-1 | 100 | | | 100 | 100 | 100 |
| | | A-2 | | 100 | | | | |
| | | A-3 | | | 100 | | | |
| Polyoxyalkylene plasticizer | (b5) | ARCOL PPG-3025 | | | | 30 | | |
| | | UCON LB-65 | 15 | | | | | |
| | | UCON 50-HB-260 | 50 | 30 | 30 | | | 30 |
| | | UCON 50-HB-660 | | | | | | |
| | (b4) | Jeffamine D-2000 | | 35 | 35 | | 65 | |
| | | Jeffamine M-600 | | | | | | |
| | | Jeffamine D-400 | 5 | | | | | |
| | | Jeffamine D-230 | | | | 35 | | |
| | | Jeffamine ED-600 | | | | | | 35 |
| Colloidal calcium carbonate | | Ultra Pflex | 50 | 50 | 50 | 100 | 100 | 50 |
| Surface-treated ground calcium carbonate | | Hubercarb G2T | 80 | | | | | |
| Titanium oxide | | Ti-Pure R902+ | 20 | 20 | 20 | 20 | 20 | 20 |
| Thixotropic agent | | Crayvallac SL | 3 | 6 | 6 | 4 | 4 | 6 |
| Ultraviolet absorber | | Tinuvin 328 | 1 | 1 | 1 | 1 | 1 | 1 |
| Light stabilizer | | Tinuvin 770 | 1 | 1 | 1 | 1 | 1 | 1 |
| Amine compound: component (C) | | Laurylamine | | 5 | 5 | 5 | 5 | 5 |
| Dehydrating agent | | A-171 | 3 | 3 | 3 | 3 | 3 | 3 |
| Amino group-containing silane coupling agent: component (D) | | A-1120 | 3 | 6 | 6 | 6 | 6 | 6 |
| Curing catalyst | | Neostan U-220H | 1.5 | 0.15 | 0.15 | 2 | 2 | 1.5 |
| Total | | | 332.5 | 257.15 | 257.15 | 307 | 307 | 258.5 |
| Ratio (W2/W1) of total weight (W2) of component (A) and component (B) with respect to total weight of curable composition (W1) | | | 51 wt % | 64 wt % | 64 wt % | 54 wt % | 54 wt % | 64 wt % |
| Migration of plasticizer to membrane surface after curing | | | A | A | A | D | A | C |
| Curability before storage | T1: skinning time (min) | | 73 | 30 | 25 | — | 66 | — |
| Curability after storage | T2: skinning time (min) | | 78 | 33 | 29 | — | 118 | — |
| Curing retardation rate | [T2/T1] | | 1.07 | 1.10 | 1.16 | — | 1.79 | — |
| Viscosity before storage (2 rpm) | η1(Pa·s) | | 408 | 920 | 1100 | — | 1580 | — |
| Viscosity after storage (2 rpm) | η2(Pa·s) | | 546 | 852 | 1063 | — | 998 | — |
| Thickening ratio | [η2/η1] | | 1.34 | 0.93 | 0.97 | — | 0.63 | — |
| Thickness of membrane: α | (mil) | | 31.5 | 29.5 | 31.8 | — | 33.2 | — |
| Moisture vapor transmission (ASTM E-96): β | (Perms) | | 29.3 | 33.3 | 32.9 | — | 19.6 | — |
| [α × β/1000] | (Perm · inch) | | 0.92 | 0.98 | 1.05 | — | 0.65 | — |

As shown in Table 5, the curable compositions (III) of Examples 41 and 42 that contained both the component (b4) and the component (b5) had a moisture permeability, which was better than that of Example 20 that contains only the component (b5) with the same blending formulation. The curable compositions (III) of Examples 43 to 48 also had favorable moisture permeability, and no migration of the plasticizer to the membrane surface after curing was observed. On the other hand, the migration of the plasticizer to the membrane surface after curing was observed in Comparative Example 5 that contained Jeffamine D-230 with a molecular weight of less than 300 and Comparative Example 7 that contained Jeffamine ED-600 whose main chain contained less than 40% by weight of an oxypropylene-derived repeating unit. In addition, in Comparative Example 6 with the sole use of the component (b4), the viscosity after storage tended to remarkably decrease.

The invention claimed is:

1. A moisture-permeable waterproofing material for a building comprising a cured product obtained by curing a curable composition comprising:
   (A) a polyoxyalkylene polymer having a silicon-containing group crosslinkable by forming a siloxane bond which is selected from a group consisting of —CH$_2$CH$_2$CH$_2$—SiCH$_3$(OCH$_3$)$_2$ and —CH$_2$CH$_2$CH$_2$—Si(OCH$_3$)$_3$ at its terminal;
   wherein the polyoxyalkylene polymer is a polyoxypropylene polymer;
   (B) a polyoxyalkylene plasticizer whose main chain contains 5 wt % or more of an oxypropylene-derived repeating unit and has one or more groups, at an end thereof, selected from the group consisting of an —OH group, a group represented by the formula (7):

—OR$^9$ (wherein R$^9$ is a substituted or unsubstituted C$_{1-20}$ hydrocarbon group),
   and a group represented by the formula (8):

—NR$^{10}_2$ (wherein R$^{10}$ is each independently a hydrogen atom, or a substituted or unsubstituted C$_{1-20}$ hydrocarbon group),
   said curable composition being liquid and being a curable composition wherein the component (B) is a polyoxyalkylene plasticizer (B1) that does not have an —NH$_2$ group at a molecular chain end, and contains polyoxyalkylene (b1) that has an —OH group at all molecular chain ends, and has a molecular weight of 300 to 1000, and
   wherein a ratio (W2/W1) of a total weight (W2) of the component (A) and the component (B1) with respect to a total weight of the curable composition (W1) is 53 to 78 wt %, and
   wherein moisture permeability according to ASTM E96 (wet cup method) of said cured product is 0.6 perm·inch or more.

2. The moisture-permeable waterproofing material according to claim 1,
   wherein the cured product is in a membrane form having a thickness of 0.005 to 0.05 inch.

3. The moisture-permeable waterproofing material according to claim 2,
   wherein moisture permeability according to ASTM E96 (wet cup method) of said cured product is 0.8 perm·inch or more.

4. A liquid-applied moisture-permeable waterproofing method comprising: applying the cured product according to claim 2 to a building.

5. A liquid-applied moisture-permeable waterproofing method comprising: applying the cured product according to claim 2 to a substrate of an exterior wall of a building.

6. A liquid-applied moisture-permeable waterproofing method comprising: applying the cured product according to claim 2 around an opening of a building.

7. A liquid-applied moisture-permeable waterproofing method comprising: applying the cured product according to claim 2 to a roof of a building.

8. The moisture-permeable waterproofing material according to claim 2, which is for a substrate of an exterior wall of a building.

9. The moisture-permeable waterproofing material according to claim 2, which is for areas around an opening of a building.

10. The moisture-permeable waterproofing material according to claim 2, which is for a roof of a building.

11. The moisture-permeable waterproofing material according to claim 1 wherein moisture permeability according to ASTM E96 (wet cup method) of said cured product is 0.8 perm·inch or more.

12. The moisture-permeable waterproofing material according to claim 1, which is for a substrate of an exterior wall of a building.

13. The moisture-permeable waterproofing material according to claim 1, which is for areas around an opening of a building.

14. The moisture-permeable waterproofing material according to claim 1, which is for a roof of a building.

* * * * *